(12) United States Patent
Hayes

(10) Patent No.: US 6,787,245 B1
(45) Date of Patent: Sep. 7, 2004

(54) SULFONATED ALIPHATIC-AROMATIC COPOLYESTERS AND SHAPED ARTICLES PRODUCED THEREFROM

(75) Inventor: Richard Allen Hayes, Brentwood, TN (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/459,189

(22) Filed: Jun. 11, 2003

(51) Int. Cl.[7] .......................... B32B 27/36; C08G 75/00
(52) U.S. Cl. ................... 428/480; 528/295; 528/296; 528/302; 528/308; 528/308.6; 525/437; 525/444; 524/9; 524/13; 524/14; 524/15; 524/35; 524/47; 524/81; 524/424; 524/425; 524/442; 524/445; 428/221; 428/384
(58) Field of Search .............................. 528/295, 296, 528/302, 308, 308.6; 525/437, 444; 524/9, 13, 14, 15, 35, 47, 81, 424, 425, 445, 442; 428/221, 384, 480

(56) References Cited

U.S. PATENT DOCUMENTS

| | | |
|---|---|---|
| 3,563,942 A | 2/1971 | Helberger |
| 3,634,541 A | 1/1972 | Popp et al. |
| 3,779,993 A | 12/1973 | Kibler et al. |
| 4,104,262 A | 8/1978 | Schade |
| 4,340,519 A | 7/1982 | Kotera et al. |
| 4,390,687 A | 6/1983 | Tung |
| 4,476,189 A | 10/1984 | Posey et al. |
| 5,171,308 A | 12/1992 | Gallagher et al. |
| 5,171,309 A | 12/1992 | Gallagher et al. |
| 5,219,646 A | 6/1993 | Gallagher et al. |
| 5,295,985 A | 3/1994 | Romesser et al. |
| 5,889,135 A * | 3/1999 | Warzelhan et al. ......... 528/176 |
| 5,936,045 A | 8/1999 | Warzelhan et al. |
| 6,018,004 A | 1/2000 | Warzelhan et al. |
| 6,046,248 A | 4/2000 | Warzelhan et al. |
| 6,114,042 A | 9/2000 | Warzelhan et al. |
| 6,201,034 B1 | 3/2001 | Warzelhan et al. |
| 6,258,924 B1 | 7/2001 | Warzelhan et al. |
| 6,297,347 B1 | 10/2001 | Warzelhan et al. |
| 6,342,304 B1 | 1/2002 | Buchanan et al. |
| 6,368,710 B1 * | 4/2002 | Hayes ........................ 428/364 |

FOREIGN PATENT DOCUMENTS

WO   WO 01/19909 A1   3/2001

* cited by examiner

Primary Examiner—Samuel A. Acquah

(57) ABSTRACT

Sulfonated aliphatic-aromatic copolyesters are provided. The copolyesters are produced from a mixture of aromatic dicarboxylic acids, aliphatic dicarboxylic acids, ethylene glycol, other glycols, and components containing alkali metal or alkaline earth metal sulfo groups, such as a metal 5-sulfoisophthalic acid derivative. The copolyesters have lower sulfonation than known sulfonated polyesters, and provide advantageous thermal properties for some end uses. The sulfonated aliphatic-aromatic copolyesters are useful in forming coatings or films on various substrates, and in packaging. Some compositions comprising the sulfonated aliphatic-aromatic copolyesters are biodegradable, as are some of the sulfonated aromatic-aromatic copolyesters.

79 Claims, No Drawings

SULFONATED ALIPHATIC-AROMATIC COPOLYESTERS AND SHAPED ARTICLES PRODUCED THEREFROM

BACKGROUND

The inadequate treatment of municipal solid waste being put into landfills and the increasing addition of nondegradable materials, including plastics, to municipal solid waste streams are combining to drastically reduce the number of landfills available and to increase the costs of municipal solid waste disposal. While recycling of reusable components of the waste stream is desirable in many instances, the costs of recycling and the infrastructure required to recycle materials is sometimes prohibitive. In addition, there are some products that do not easily fit into the framework of recycling. The composting of non-recyclable solid waste is a recognized and growing method to reduce solid waste volume for landfilling and/or making a useful product from the waste to improve the fertility of fields and gardens. One of the limitations to marketing such compost is the visible contamination by undegraded plastic, such as film or fiber fragments.

It is desirable to provide components that are useful in manufacturing disposable products and are degraded into less contaminating forms under the conditions typically existing in waste composting processes. Such conditions may include temperatures no higher than 70° C., and averaging in the 55–60° C. range, humid conditions as high as 100 percent relative humidity, and exposure times of weeks or months. It is further desirable to provide disposable components that will not only degrade aerobically/anaerobically in composting, but will continue to degrade in soil or landfill. As long as water is present, such components should break down into low molecular weight fragments that can be ultimately biodegraded by microorganisms completely into biogas, biomass, and/or liquid leachate, as do natural organic compositions such as wood.

Biodegradable materials for use in packaging are well known. Biodegradable films are also known. For example, U.S. Pat. No. 3,602,225 discloses the use of barrier films comprising plasticized, regenerated cellulose films. U.S. Pat. No. 3,952,347 discloses biodegradable films comprising a non-biodegradable matrix, such as poly(vinyl alcohol), and about 40 to 60 weight percent of a biodegradable materials, such as starch.

Sulfonated aliphatic-aromatic copolyesters, as the term is used herein, include polyesters derived from a mixture of aliphatic dicarboxylic acids and aromatic dicarboxylic acids and, in addition, incorporate a sulfonated monomer, such as a salt of 5-sulfoisophthalic acid. Aqueous dispersions of solvent soluble linear sulfonated aliphatic-aromatic copolyesters that incorporate from 0.1 to 10 mole percent of the sulfonated aromatic monomer are disclosed in U.S. Pat. No. 3,563,942. U.S. Pat. No. 3,634,541 discloses fiber-forming sulfonated aliphatic-aromatic copolyesters that include 0.1 to 10 mole percent of xylylene sulfonated salt monomers, and U.S. Pat. No. 3,779,993 discloses linear, water-dissipatable sulfonated aliphatic-aromatic copolyesters which incorporate 2 to 12.5 mole percent of a sulfonated monomer.

Known sulfonated aliphatic-aromatic copolyester compositions generally have greater than 1 mole percent, more typically, greater than 2 mole percent, of the sulfonate component. Such materials typically have been found to have thermal properties that are inadequate or less than desired for some applications. Sulfonated aliphatic-aromatic copolyester compositions having high temperature characteristics, such as a high crystalline melting point, a high glass,transition temperature, or both, would be advantageous for some enduses, such as in films, coatings, laminates, dual ovenable food trays and the like. For example, a higher level of crystallinity and crystallization rate can allow simplified production processes, such as a reduction of film blocking (sticking) during the formation of polymeric films and faster mold cycle times in the production of molded shaped articles.

SUMMARY OF THE INVENTION

The present invention provides sulfonated aliphatic-aromatic copolyesters having reduced levels of sulfonation as compared to known sulfonated aliphatic-aromatic copolyesters. The Sulfonated aliphatic-aromatic copolyesters disclosed herein include a glycol component that is primarily, and preferably substantially, ethylene glycol. The sulfonated aliphatic-aromatic copolyesters disclosed herein have physical properties that are advantageous or optimal for certain applications without the need for blending the copolyesters with other materials. In particular, the sulfonated aliphatic-aromatic copolyesters disclosed herein provide an enhanced level of crystallinity as compared to that of known sulfonated aliphatic-aromatic copolyesters.

One aspect of the present invention provides sulfonated aliphatic-aromatic copolyesters and processes for producing the copolyesters. The sulfonated aliphatic-aromatic copolyesters comprise an acid component, a glycol component, and 0 to about 5.0 mole percent of a polyfunctional branching agent based on 100 mole percent acid component. The acid component comprises about 97.95 to about 20.0 mole percent of an aromatic dicarboxylic acid component, from about 2.0 to about 79.95 mole percent of an aliphatic dicarboxylic acid component, and from about 0.05 to about 0.75 mole percent of a sulfonate component (mole percentages are based on 100 mole percent total acid component). The glycol component comprises about 100 to about 95.0 mole percent of ethylene glycol as a first glycol component and from 0 to about 5.0 mole percent of a second glycol component (mole percentages are based on 100 mole percent total glycol component). The polyfunctional branching agent comprises polyfunctional acids, glycols or mixtures thereof. In some embodiments, the copolyesters contain one or more fillers. In some embodiments, the sulfonated aliphatic-aromatic copolyesters are biodegradable.

A further aspect of the invention provides shaped articles produced from the sulfonated aliphatic-aromatic copolyesters of the present invention, and processes to produce the articles.

A further aspect of the invention provides films produced from the sulfonated aliphatic-aromatic copolyesters of the present invention. In some embodiments, the films are uniaxially oriented. In some embodiments, the films are biaxially oriented.

Another aspect of the invention provides methods for producing oriented films comprising sulfonated aliphatic-aromatic copolyesters of the present invention. In some embodiments the sulfonated aliphatic-aromatic copolyesters contain fillers. The films can be, for example, uniaxially oriented or biaixially oriented. In some embodiments, the films are used in packaging applications such as food wraps.

A further aspect of the invention provides articles comprising substrates having laminated thereon films of sulfonated aliphatic-aromatic copolyesters of the present invention. Suitable substrates include, for example, paper, paperboard, inorganic foams, organic foams, inorganic-organic foams. Another aspect of the invention provides processes for producing articles comprising substrates having the sulfonated aliphatic-aromatic copolyesters laminated thereon.

A further aspect of the invention includes substrates coated with sulfonated aliphatic-aromatic copolyesters of the present invention. In some embodiments the sulfonated aliphatic-aromatic copolyesters contain fillers. In some embodiments, coated substrates comprising the sulfonated aliphatic-aromatic copolyesters can be used in packaging, such as food packaging and other food service articles.

DETAILED DESCRIPTION

The present invention provides sulfonated aliphatic-aromatic copolyesters, and articles from the sulfonated aliphatic-aromatic copolyesters and processes to produce the copolyesters and the articles. Preferred articles made from the sulfonated aliphatic-aromatic copolyesters are in the form of films, coatings, and laminates. Films, coatings and laminates comprising the sulfonated aliphatic-aromatic copolyesters can be deposited onto substrates such as, for example, paper, paperboard, inorganic foams, organic foams, and inorganic-organic foams. Laminates comprising the sulfonated aliphatic-aromatic copolyesters can be deposited onto substrates such as, for example, paper, paperboard, inorganic foams, organic foams, inorganic-organic foams, and the like, for food packaging enduses, especially for disposable food packaging such as wraps, cups, bowls, and plates.

The sulfonated aliphatic-aromatic copolyesters comprise an acid component, a glycol component, and 0 to about 5.0 mole percent of a polyfunctional branching agent based on 100 mole percent acid component. The acid component comprises about 97.95 to about 20.0 mole percent of an aromatic dicarboxylic acid component, from about 2.0 to about 79.95 mole percent of an aliphatic dicarboxylic acid component, and from about 0.05 to about 0.75 mole percent of a sulfonate component (mole percentages are based on 100 mole percent total acid component). The glycol component comprises about 100 to about 95.0 mole percent of ethylene glycol as a first glycol component and from 0 to about 5.0 mole percent of a second glycol component (mole percentages are based on 100 mole percent total glycol component). The polyfunctional branching agent comprises polyfunctional acids, glycols or mixtures thereof.

The aromatic dicarboxylic acid component is selected from unsubstituted and substituted aromatic dicarboxylic acids, glycolate esters of aromatic dicarboxylic acids, and lower alkyl esters of aromatic dicarboxylic acids having from 8 carbons to 20 carbons. Examples of desirable dicarboxylic acids include those derived from terephthalates, isophthalates, naphthalates and bibenzoates. Specific examples of dicarboxylic acids desirable for use as an aromatic dicarboxylic acid component include terephthalic acid, dimethyl terephthalate, bis(2-hydroxyethyl) terephthalate, isophthalic acid, dimethyl isophthalate, bis(2-hydroxyethyl) isophthalate, 2,6-naphthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), and mixtures derived therefrom. Preferably, the aromatic dicarboxylic acid component is selected from terephthalic acid, dimethyl terephthalate, isophthalic acid, dimethyl isophthalate, 2,6-naphthalene dicarboxylic acid, dimethyl-2,6-naphthalate, or mixtures thereof. Essentially any aromatic dicarboxylic acid can be used. Preferably, the sulfonated polyester compositions include from about 80 to about 50 mole percent of the aromatic dicarboxylic acid component.

The aliphatic dicarboxylic acid component is selected from unsubstituted, substituted, linear, and branched aliphatic dicarboxylic acids, glycolate esters of aliphatic dicarboxylic acids, and the lower alkyl esters of aliphatic dicarboxylic acids having 2 to 36 carbon atoms. Specific examples of desirable aliphatic dicarboxylic acid components include oxalic acid, dimethyl oxalate, malonic acid, dimethyl malonate, succinic acid, dimethyl succinate, methylsuccinic acid, glutaric acid, is dimethyl glutarate, 2-methylglutaric acid, 3-methylglutaric acid, adipic acid, dimethyl adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, and the like and mixtures derived therefrom. Preferably, the aliphatic dicarboxylic acid component is selected from succinic acid, dimethyl succinate, glutaric acid, dimethyl glutarate, adipic acid, dimethyl adipate and mixtures thereof.

Essentially any aliphatic dicarboxylic acid can be used. Preferably, the acid component of the copolyester includes from about 20 to about 50 mole percent of the aliphatic dicarboxylic acid component.

The sulfonated aliphatic-aromatic copolyesters contain from about 0.05 to about 0.75 mole percent sulfonate groups. The sulfonate groups can be incorporated in aliphatic or aromatic monomers. Also, the sulfonate components can be incorporated into the main chain of the polymer or as endgroups. Exemplary aliphatic sufonate components include metal salts of sulfosuccinic acid. Exemplary useful endgroup aromatic sulfonate components include metal salts of 3-sulfobenzoic acid, 4-sulfobenzoic acid, and 5-sulfosalicylic acid. Preferred are sulfonate components wherein the sulfonate salt group is attached to an aromatic dicarboxylic acid. The aromatic dicarboxylic acid can contain as an aromatic nucleus, for example, benzene, naphthalene, diphenyl, oxydiphenyl, sulfonyidiphenyl, methylenediphenyl. Preferably, the sulfonate component is the residue of a sulfonate-substituted phthalic acid, terephthalic acid, isophthalic acid, 2,6-naphthalenedicarboxylic acid. More preferably, the sulfonate component is a metal salt of 5-sulfoisophthalic acid or a lower alkyl ester of 5-sulfoisophthalate. The metal salt can be, for example, a monovalent or polyvalent alkali metal ions, alkaline earth metal ions, or other metal ion. The alkali metal ion is preferably sodium, potassium or lithium. However, alkaline earth metals such as magnesium are also useful. Other useful metal ions include transition metal ions, such as zinc, cobalt or iron Multivalent metal ions can be advantageous when an increase in the melt viscosity of the sulfonated aliphatic-aromatic copolyester is desired. Examples of end uses in which such melt viscosity enhancements may prove useful include melt extrusion coatings, melt blown containers or film, and foam. As little as 0.05 mole percent of the sulfo group contributes significantly to the biodegradable and surface property characteristics of the resultant films or coatings. Preferably, the amount of sulfo group-containing component is from about 0.1 to 0.75 mole percent based on 100 mole percent total acid component.

The first glycol component a glycol component of the sulfonated aliphatic-aromatic copolyesters of the present invention is primarily, and preferably substantially, ethylene glycol.

The second glycol component comprises one or more glycols selected from unsubstituted, substituted, straight chain, branched, cyclic aliphatic, aliphatic-aromatic and aromatic diols having from 2 carbon atoms to 36 carbon atoms. Specific examples of desirable second glycol components include 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)-tricyclo[5.2.1.0/2.6] decane, 1,4-cyclohexanedimethanol, isosorbide, di(ethylene glycol), tri(ethylene glycol), poly(alkylene ether)glycols having molecular weights within the range of about 500 to about 4000, such as, for example, poly(ethylene glycol), poly(1,3-propylene glycol), poly(1,4-butylene glycol), (polytetrahydrofuran), poly(pentmethylene glycol), poly(hexamethylene glycol), poly(hepthamethylene glycol), poly(ethylene glycol)-block-poly(propylene glycol)-block-poly(ethylene glycol), 4,4'-isopropylidenediphenol ethoxylate (Bisphenol A ethoxylate), 4,4'-(1-phenylethylidene) bisphenol ethoxylate (Bisphenol AP ethoxylate), 4,4'-ethylidenebisphenol ethoxylate (Bisphenol E ethoxylate), bis(4-hydroxyphenyl)methane ethoxylate (Bisphenol F ethoxylate), 4,4'-(1,3-phenylenediisopropylidene)bisphenol ethoxylate (Bisphenol M ethoxylate), 4,4'-(1,4-phenylenediisopropylidene)bisphenol ethoxylate Bisphenol P ethoxylate), 4,4'sulfonyidiphenol ethoxylate (Bisphenol S ethoxylate), and 4,4'-cyclohexylidenebisphenol ethoxylate (Bisphenol Z ethoxylate). Essentially any other glycol known can be used.

The optional polyfunctional branching agent can be any material having three or more functional groups selected from carboxylic acid functional groups, hydroxy functional groups and mixtures thereof. Specific examples of polyfunctional branching agents include 1,2,4-benzenetricarboxylic acid (trimellitic acid), trimethyl-1,2,4-benzenetricarboxylate, tris(2-hydroxyethyl)-1,2,4-benzenetricarboxylate, 1,2,4-benzenetricarboxylic anhydride (trimellitic anhydride), 1,3,5-benzenetricarboxylic acid, 1,2,4,5-benzenetetracarboxylic acid (pyromellitic acid), 1,2,4,5-benzenetetracarboxylic dianhydride (pyromellitic anhydride), 3,3',4,4'-benzophenonetetracarboxylic dianhydride, 1,4,5,8-naphthalenetetracarboxylic dianhydride, citric acid, tetrahydrofuran-2,3,4,5-tetracarboxylic acid, 1,3,5-cyclohexanetricarboxylic acid, pentaerythritol, glycerol, 2-(hydroxymethyl)-1,3-propanediol, 2,2-bis(hydroxymethyl)propionic acid, and the like and mixture therefrom. Any polyfunctional material that includes three or more carboxylic acid or hydroxyl functions can be used. The polyfunctional branching agent can be included, for example, when a higher resin melt viscosity is desired for specific enduses. Examples of such enduses include melt extrusion coatings, melt blown films or containers, foam and the like. Preferably, if a polyfunctional branching agent is used, the copolyester contains up to 1.0 mole percent of the polyfunctional branching agent based on 100 mole percent of the total acid component.

Although the molecular weight of the copolyesters can be measured directly preferably the inherent viscosity of the copolyester in solution or the melt viscosity is used as an indicator of molecular weight. The inherent viscosity as an indicator of molecular weight is particularly useful in comparing polymers within a polymer family, such as poly(ethylene terephthalate), poly(butylene terephthalate), etc., and is used as the indicator of molecular weight herein. To obtain the desired physical properties, the sulfonated aliphatic-aromatic copolyesters preferably have an inherent viscosity of at least about 0.15 dL/g, as measured on a 0.5 percent (weight/volume) solution of the copolyester in a 50:50 (weight) solution of trifluoroacetic acid dichloromethane solvent system at room temperature. For some applications, the inherent viscosity, (IV), of the sulfonated aliphatic-aromatic copolyesters is preferably at least 0.35 dL/g. Higher inherent viscosities are desirable for certain other applications, such as films, bottles, sheet, molding resin and the like. The polymerization conditions can be adjusted to obtain the desired inherent viscosities up to at least about 0.5 and desirably higher than 0.65 dL/g. Further processing of the copolyester may result in inherent viscosities of 0.7, 0.8, 0.9, 1.0, 1.5, 2.0 dL/g and even higher.

The sulfonated aliphatic-aromatic copolyester of the present invention preferably incorporates the dicarboxylic acids and the glycols in approximately stoichiometric amounts. Preferably this would be in the range of 95 to 105 mole percent of total diacids incorporated into the final polymer based on 100 mole percent total glycols. More preferably, this would be in the range of 98 to 102 mole percent of total diacids incorporated into the final polymer based on 100 mole percent total glycols.

The copolyesters can be prepared by conventional polycondensation processes. The composition of the sulfonated aliphatic-aromatic sulfonated copolyester, particularly with regard to the amount of diol present within the copolyester, depends, in part, on the method of preparation used. Suitable polycondensation processes include the reaction of the diol monomers with the acid chlorides. For example, acid chlorides of the aromatic dicarboxylic acid component, acid chlorides of the aliphatic dicarboxylic acid component, and acid chlorides of the sulfonate component can be combined with the ethylene glycol and the second glycol component in a solvent, such as toluene, in the presence of a base, such as pyridine, which neutralizes the hydrochloric acid as it is produced. Such procedures are disclosed, for example, by R. Storbeck, et al., in *J. Appl. Polymer Science*, Vol. 59, pp. 1199–1202 (1996). Other well-known methods using acid chlorides can also be used, such as interfacial polymerization, or the monomers can simply be stirred together while heating.

When the polymer is made using acid chlorides, the ratio of the monomer units in the product polymer is generally about the same as the ratio of reacting monomers. Therefore, the ratio of monomers charged to the reactor is about the same as the desired ratio in the copolyester. A stoichiometric equivalent of the diol components and the diacid components generally is used to obtain a high molecular weight polymer.

Preferably, the sulfonated aliphatic-aromatic copolyesters are produced by a melt polymerization method. In the melt polymerization method, the aromatic dicarboxylic acid component, (either as acids, esters, or mixtures thereof, the aliphatic dicarboxylic acid component, (either as acids, esters, or mixtures thereof), the sulfonate component, the ethylene glycol, the second glycol component and optionally the polyfunctional branching agent, are combined in the presence of a catalyst and heated to a high enough temperature that the monomers combine to form esters and diesters, then oligomers, and finally polymers. The polymeric product at the end of the polymerization process is molten. Generally, the ethylene glycol and the second glycol component are volatile and distill from the reactor as the polymerization proceeds. Such procedures are known.

The melt polymerization conditions, particularly the amounts of monomers used, depend on the polymer composition that is desired. The amount of ethylene glycol, second glycol component, aromatic dicarboxylic acid component, aliphatic dicarboxylic acid component, sulfonate compound and branching agent are chosen so that the final polymeric product contains the desired amounts of the various monomer units, desirably with equimolar amounts of monomer units derived from the respective diol and diacid components. Because of the volatility of some of the monomers, especially some second glycol components and the ethylene glycol component, and depending on such variables as whether the reactor is sealed, (i.e.; is under pressure), the polymerization temperature ramp rate, and the efficiency of the distillation columns used in synthesizing the polymer, some of the monomers can be included in excess at the beginning of the polymerization reaction and removed by distillation as the reaction proceeds. This is particularly true of the second glycol component and of the ethylene glycol component.

The exact amount of monomers to be charged to a particular reactor can be determined by a skilled practitioner, but often will be in the ranges below. Excesses of the diacid, the ethylene glycol component, and the other glycol are often desirably charged, and the excess diacid, ethylene glycol and the other glycol are desirably removed by distillation or other method of evaporation as the polymerization reaction proceeds. Ethylene glycol is desirably charged at 10 to 100 percent greater than the amount desired in the final polymer. More preferably, the ethylene glycol component is charged at 20 to 70 percent greater than the amount desired in the final polymer. The second glycol component is desirably charged at 0 to 100 percent greater than the amount desired in the final product, depending on the exact volatility of the second glycol component.

The width of the ranges given for the monomers is due to the wide variation in the monomer loss during polymerization, which depends on the efficiency of distillation columns and other kinds of recovery and recycle systems and the like; thus the ranges are only an approximation. Exact amounts of monomers that are charged to a specific reactor to achieve a specific composition can be determined by a skilled practitioner:

In the polymerization process, the monomers are combined, and heated gradually with mixing in the presence of a catalyst or catalyst mixture to a temperature in the range of 230 C to about 300 C, preferably 250 C to 295 C. The exact conditions and the catalysts depend on whether the diacids polymerize as true acids or as dimethyl esters. The catalyst can be included initially with the reactants and/or added one or more times to the mixture as it is heated. The catalyst used can be modified as the reaction proceeds. The heating and stirring are continued for a sufficient time and to a sufficient temperature, generally with removal by distillation of excess reactants, to yield a molten polymer having a high enough molecular weight to be suitable for making fabricated products.

Suitable catalysts include salts of Li, Ca, Mg, Mn, Zn, Pb, Sb, Sn, Ge, and Ti, such as acetate salts and oxides, including glycol adducts, and Ti alkoxides. Such catalysts are known to those skilled in the art and the specific catalyst or combination or sequence of catalysts used can be selected by a skilled practitioner. The preferred catalyst and preferred conditions depend on, for example, whether the diacid monomer is polymerized as the free diacid or as a dimethyl ester and the exact chemical identity of the glycol components. Essentially any catalyst system known can be used.

The monomer composition used in making the polymer is chosen for specific uses and for specific sets of properties. As one skilled in the art will appreciate, the exact thermal properties observed in the polymer are affected by the chemical identity and level of each component utilized in making the copolyester.

Polymers having adequate inherent viscosity for many applications can be made by the melt condensation process above. Solid state polymerization can be used to achieve even higher inherent viscosities (molecular weights).

A polymer made by melt polymerization, after extruding, cooling and pelletizing, may be essentially noncrystalline. Noncrystalline material can be made semicrystalline by heating it to a temperature above the glass transition temperature for an extended period of time. This induces crystallization so that the product can then be heated to a higher temperature to raise the molecular weight. The polymer can also be crystallized prior to solid state polymerization by treatment with a relatively poor solvent for polyesters, which induces crystallization. Solvent induced crystallization is known for polyesters and is described in U.S. Pat. No. 5,164,478 and U.S. Pat. No. 3,684,766. The semicrystalline polymer is subjected to solid state polymerization by placing the pelletized or pulverized polymer into a stream of an inert gas, usually nitrogen, or under a vacuum of 1 Torr, at an elevated temperature, but below the melting temperature of the polymer for an extended period of time.

Known additives can be used in the sulfonated aliphatic-aromatic copolyesters. It is preferred that the additives are nontoxic, biodegradable and biobenign. Such additives include thermal stabilizers, for example, phenolic antioxidants, secondary thermal stabilizers, for example, thioethers and phosphites, UV absorbers, for example benzophenone- and benzotriazole-derivatives, UV stabilizers, for example, hindered amine light stabilizers, (HALS), and the like. Other useful additives include plasticizers, processing aids, flow enhancing additives, lubricants, pigments, flame retardants, impact modifiers, nucleating agents to increase crystallinity, antiblocking agents such as silica, base buffers such as sodium acetate, potassium acetate, and tetramethyl ammonium hydroxide, (for example; as disclosed in U.S. Pat. No. 3,779,993, U.S. Pat. No. 4,340,519, U.S. Pat. No. 5,171,308, U.S. Pat. No. 5,171,309, and U.S. Pat. No. 5,219,646 and references cited therein), and the like. Specific examples of plasticizers, which may be added to improve processing, final mechanical properties, or to reduce rattle or rustle of the films, coatings and laminates, include soybean oil, epoxidized soybean oil, corn oil, caster oil, linseed oil, epoxidized linseed oil, mineral oil, alkyl phosphate esters, Tween® 20, Tween® 40, Tween® 60, Tween® 80, Tween® 85, sorbitan monolaurate, sorbitan monooleate, sorbitan monopalmitate, sorbitan trioleate, sorbitan monostearate, citrate esters, such as trimethyl citrate, triethyl citrate, (Citroflex® 2, produced by Morflex, Inc. Greensboro, N.C.), tributyl citrate, (Citroflex® 4, produced by Morflex, Inc., Greensboro, N.C.), trioctyl citrate, acetyltri-n-butyl citrate, (Citroflex® A-4, produced by Morflex, Inc., Greensboro, N.C.), acetyltriethyl citrate, (Citroflex® A-2, produced by Morflex, Inc., Greensboro, N.C.), acetyltri-n-hexyl citrate, (Citroflex® A-6, produced by Morflex, Inc., Greensboro, N.C.), and butyryltri-n-hexyl citrate, (Citroflex® B-6, produced by Morflex, Inc., Greensboro, N.C.), tartarate esters, such as dimethyl tartarate, diethyl tartarate, dibutyl tartarate, and dioctyl tartarate, poly(ethylene glycol), derivatives of poly (ethylene glycol), paraffin, monoacyl carbohydrates, such as 6-O-sterylglucopyranoside, glyceryl monostearate, Myvaplex® 600, (concentrated glycerol monostearates), Nyvaplex®, (concentrated glycerol monostearate which is a 90% minimum distilled monoglyceride produced from hydrogenated soybean oil and which is composed primarily of stearic acid esters), Myvacet, (distilled acetylated monoglycerides of modified fats),Myvacet® 507, (48.5 to 51.5 percent acetylation), Myvacet® 707, (66.5 to 69.5 percent acetylation), Myvacet® 908, (minimum of 96 percent acetylation), Myverol®, (concentrated glyceryl monostearates), Acrawax®, N,N-ethylene bis-stearamide, N,N-ethylene bis-oleamide, dioctyl adipate, diisobutyl adipate, diethylene glycol dibenzoate, dipropylene glycol dibenzoate, polymeric plasticizers, such as poly(1,6-hexamethylene adipate), poly(ethylene adipate), Rucoflex®, and other compatible low molecular weight polymers and the like and mixtures thereof. Preferably, the plasticizers are nontoxic and biodegradable and/or bioderived. Essentially any known additives can be used.

In addition, the compositions can be filled with inorganic, organic and clay fillers, for example, wood flour, gypsum, talc, mica, carbon black, wollastonite, montmorillonite minerals, chalk, diatomaceous earth, sand, gravel, crushed rock, bauxite, limestone, sandstone, aerogels, xerogels, microspheres, porous ceramic spheres, gypsum dihydrate, calcium aluminate, magnesium carbonate, ceramic materials, pozzolamic materials, zirconium compounds, xonotlite (a crystalline calcium silicate gel), perlite, vermiculite, hydrated or unhydrated hydraulic cement particles, pumice, perlite, zeolites, kaolin, clay fillers, including both natural and synthetic clays and treated and untreated clays, such as organoclays and clays that have been surface treated with silanes and stearic acid to enhance adhesion with the copolyester matrix, smectite clays, magnesium aluminum silicate, bentonite clays, hectorite clays, silicon oxide, calcium terephthalate, aluminum oxide, titanium dioxide, iron oxides, calcium phosphate, barium sulfate, sodium carbonate, magnesium sulfate, aluminum sulfate, magnesium carbonate, barium carbonate, calcium oxide, magnesium oxide, aluminum hydroxide, calcium sulfate, barium sulfate, lithium fluoride, polymer particles, powdered metals, pulp powder, cellulose, starch, chemically modified starch, thermoplastic starch, lignin powder, wheat, chitin, chitosan, keratin, gluten, nut shell flour, wood flour, corn cob flour, calcium carbonate, calcium hydroxide, glass beads, hollow glass beads, seagel, cork, seeds, gelatins, wood flour, saw dust, agar-based materials, reinforcing agents, such as glass fiber, natural fibers, such as sisal, hemp, cotton, wool, wood, flax, abaca, sisal, ramie, bagasse, and cellulose fibers, carbon fibers, graphite fibers, silica fibers, ceramic fibers, metal fibers, stainless steel fibers, recycled paper fibers, for example, from repulping operations, and the like. Fillers may tend to increase the Young's modulus, improve the dead-fold properties, improve the rigidity of the film, coating or laminate, decrease the cost, and reduce the tendency of the film, coating, or laminate to block or self-adhere during processing or use. The use of fillers have also been found to produce plastic articles that have qualities of paper, such as texture and feel, as disclosed by, for example, Miyazaki, et al., in U.S. Pat. No. 4,578,296. The additives, fillers or blend materials can be added before the polymerization process, at any stage during the polymerization process or as a post polymerization process. Any filler material known for use in polyesters can be used.

Clay fillers include both natural and synthetic clays and untreated and treated clays, such as organoclays and clays that have been surface treated with silanes or stearic acid to enhance the adhesion with the copolyester matrix. Specific usable clay materials include, for example, kaolin, smectite clays, magnesium aluminum silicate, bentonite clays, montmorillonite clays, hectorite clays, and the like and mixtures thereof. The clays can be treated with organic materials, such as surfactants, to make them organophilic. Specific commercial examples of usable clay fillers include Gelwhite MAS 100, a commercial product of the Southern Clay Company; Claytone 2000, a commercial product of the i5 Southern Clay Company; Gelwhite L, a commercial product of the Southern Clay Company; Cloisite 30 B, a commercial product of the Southern Clay Company; Cloisite Na, a commercial product of the Southern Clay Company; Garamite 1958, a commercial product of the Southern Clay Company; Laponite RDS, a commercial product of the Southern Clay Company; Laponite RD, a commercial product of the Southern Clay Company; Nanomers, which are commercial products of the Nanocor Company; Nanomer 1.24TL, a commercial product of the Nanocor Company; "P Series" Nanomers, which are commercial products of the Nanocor Company; Polymer Grade (PG) Montmorillonite PGW, a commercial product of the Nanocor Company; Polymer Grade (PG) Montmorillonite PGA, a commercial product of the Nanocor Company; Polymer Grade (PG) Montmorillonite PGV, a commercial product of the Nanocor Company; Polymer Grade (PG) Montmorillonite PGN, a commercial product of the Nanocor Company; and the like and mixtures thereof. Any known clay filler can be used.

Some of the desirable clay fillers may exfoliate by the process to provide nanocomposites. This is especially true for the layered silicate clays, such as smectite clays, magnesium aluminum silicate, bentonite clays, montmorillonite clays, hectorite clays, and the like. As discussed above, such clays can be natural or synthetic, treated or not. The clay particle size in the final filled sulfonated aliphatic-aromatic copolyester can be within a wide range.

The particle size of the filler can be within a wide range. As will be recognized by one skilled in the art, the filler particle size can be tailored based on the desired use of the filled copolyester composition. It is preferred that the average diameter of the filler be less than about 40 microns. More preferably, the average diameter of the filler is less than about 20 microns. However, the filler can include particles of sizes ranging up to 40 mesh, (US Standard), or larger. Mixtures of filler particle sizes can also be advantageously utilized. For example, mixtures of calcium carbonate fillers having average particle sizes of about 5 microns and of about 0.7 microns may provide better space filling of the filler within the copolyester matrix. Use of two or more filler particle sizes allows for improved particle packing, in which the space between a group of large particles is substantially occupied by a group of smaller filler particles. In general, the particle packing is increased whenever a set of particles having a first particle size is mixed with another set of particles having a second particle size that is at least about 2 times larger or smaller than the first particle size. The particle packing density for a two-particle system is maximized whenever the size of the second set of particles is from about 3 to 10 times the size of the first set of particles. Similarly, three or more different sets of particles can be used to further increase the particle packing density. The optimal degree of packing depends upon a number of factors, such as, for example, the types and concentrations of the various components within both the thermoplastic phase and the solid filler phase, the film, coating or lamination process used, and the desired mechanical, thermal and other performance properties of the final products to be manufactured. Andersen, et al., in U.S. Pat. No. 5,527,387, disclose particle packing techniques. Filler concentrates that incorporate a mixture of filler particle sizes based on the above particle packing techniques are commercially available from the Shulman Company under the tradename Papermatch®.

The filler can be added to the polymer at any stage during the polymerization of the polymer or after the polymerization is completed. For example, the filler can be added with the copolyester monomers at the start of the polymerization process, which is preferred for, for example, silica and titanium dioxide fillers, to provide adequate dispersion of the fillers within the polyester matrix. Alternatively, the filler can be added at an intermediate stage of the polymerization, for example, as the precondensate passes into the polymerization vessel. As yet a further alternative, the filler can be added after the copolyester exits the polymerizer. For example, the copolyester can be melt fed to any intensive mixing operation, such as a static mixer or a single- or twin-screw extruder and compounded with the filler.

As yet a further method to produce filled copolyesters, the copolyester can be combined with the filler in a subsequent postpolymerization process. Typically, such a process includes intensive mixing of the molten copolyester with the filler. The intensive mixing can be provided by static mixers, Brabender mixers, single screw extruders, twin screw extruders and the like. In a typical process, the copolyester is dried. The dried copolyester can then be mixed with the filler. Alternatively, the copolyester and the filler can be co-fed through two different feeders. In an extrusion process, the copolyester and the filler are typically fed into the back, feed section of the extruder. However, the copolyester and the filler can be advantageously fed into two different locations of the extruder. For example, the copolyester can be added in the back, feed section of the extruder while the filler is fed, ("side-stuffed"), in the front of the extruder near the die plate. The extruder temperature profile is set up to allow the copolyester to melt under the processing conditions. The screw design also provides stress and, in turn, heat, to the resin as it mixes the molten copolyester with the filler. Such processes to melt mix in fillers are disclosed, for example, by Dohrer, et al., in U.S. Pat. No. 6,359,050. Alternatively, the filler can be blended with the polyester during the formation of the films and coatings, as described below.

The copolyesters can be blended with other polymeric materials. The materials can be biodegradable or not biodegradable, naturally derived, modifed naturally derived and/or synthetic.

Examples of blendable biodegradable materials include sulfonated aliphatic-aromatic copolyesters, such as are sold under the Biomax® tradename by the DuPont Company, aliphatic-aromatic copolyesters, such as are sold under the Eastar Bio® tradename by the Eastman Chemical Company, (Eastar Bio® is chemically believed to be essentially poly (1,4-butylene adipate-coterephthalate, (55:45, molar)), sold under the Ecoflex® tradename by the BASF corporation, (Ecoflex® is believed to be essentially poly(1,4-butylene terephthalate-co-adipate, (50:50, molar) and may be chain-extended by the addition of hexamethylenediisocyanate), and sold under the EnPol® tradename by the Ire Chemical Company, aliphatic polyesters, such as poly(1,4-butylene succinate), (Bionolle® 1001, from Showa High Polymer Company), poly(ethylene succinate), poly(1,4-butylene adipate-co-succinate), (Bionolle® 3001, from the Showa High Polymer Company), and poly(1,4-butylene adipate) as, for example, sold by the Ire Chemical Company under the tradename of EnPol®, sold by the Showa High Polymer Company under the tradename of Bionolle®, sold by the Mitsui Toatsu Company, sold by the Nippon Shokubai Company, sold by the Cheil Synthetics Company, sold by the Eastman Chemical Company, and sold by the Sunkyon Industries Company, poly(amide esters), for example, as sold under the Bak® tradename by the Bayer Company, (these materials are believed to include the constituents of adipic acid, 1,4-butanediol, and 6-aminocaproic acid), polycarbonates, for example such as poly(ethylene carbonate) sold by the PAC Polymers Company, poly (hydroxyalkanoates), such as poly(hydroxybutyrate)s, poly (hydroxyvalerate)s, poly(hydroxybutyrate-co-hydroxyvalerate)s, for example such as sold by the Monsanto Company under the Biopol® tradename, poly (lactide-co-glycolide-co-caprolactone), for example as sold by the Mitsui Chemicals Company under the grade designations of H100J, S100, and T100, poly(caprolactone), for example as sold under the Tone(R) tradename by the Union Carbide Company and as sold by the Daicel Chemical Company and the Solvay Company, and poly(lactide), for example as sold by the Cargill Dow Company under the tradename of EcoPLA® and the Dianippon Company, and the like, and mixtures thereof.

Examples of blendable nonbiodegradable polymeric materials include polyethylene, high density polyethylene, low density polyethylene, linear low density polyethylene, ultralow density polyethylene, polyolefins, poly(ethylene-co-glycidylmethacrylate), poly(ethylene-co-methyl (meth) acrylate-co-glycidyl acrylate), poly(ethylene-co-n-butyl acrylate-co-glycidyl acrylate), poly(ethylene-co-methyl acrylate), poly(ethylene-co-ethyl acrylate), poly(ethylene-co-butyl acrylate), poly(ethylene-co-(meth)acrylic acid), metal salts of poly(ethylene-co-(meth)acrylic acid), poly ((meth)acrylates), such as poly(methyl methacrylate), poly (ethyl methacrylate), and the like, poly(ethylene-co-carbon monoxide), poly(vinyl acetate), poly(ethylene-co-vinyl acetate), poly(vinyl alcohol), poly(ethylene-co-vinyl alcohol), polypropylene, polybutylene, polyesters, poly (ethylene terephthalate), poly(1,3-propyl terephthalate), poly(1,4-butylene terephthalate), PETG, poly(ethylene-co-1,4-cyclohexanedimethanol terephthalate), poly(vinyl chloride), PVDC, poly(vinylidene chloride), polystyrene, syndiotactic polystyrene, poly(4-hydroxystyrene), novalacs, poly(cresols), polyamides, nylon, nylon 6, nylon 46, nylon 66, nylon 612, polycarbonates, poly(bisphenol A carbonate), polysulfides, poly(phenylene sulfide), polyethers, poly(2,6-dimethylphenylene oxide), polysulfones, and the like, and copolymers thereof and mixtures thereof.

Examples of blendable natural polymeric materials include starch, starch derivatives, modified starch, thermoplastic starch, cationic starch, anionic starch, starch esters, such as starch acetate, starch hydroxyethyl ether, alkyl starches, dextrins, amine starches, phosphate starches, dialdehyde starches, cellulose, cellulose derivatives, modified cellulose, cellulose esters, such as cellulose acetate, cellulose diacetate, cellulose priopionate, cellulose butyrate, cellulose valerate, cellulose triacetate, cellulose tripropionate, cellulose tributyrate, and cellulose mixed esters, such as cellulose acetate propionate and cellulose acetate butyrate, cellulose ethers, such as methylhydroxyethylcellulose, hydroxymethylethylcellulose, carboxymethylcellulose, methyl cellulose, ethylcellulose, hydroxyethycellulose, and hydroxyethylpropylcellulose, polysaccharides, alginic acid, alginates, phycocolloids, agar, gum arabic, guar gum, acaia gum, carrageenan gum, furcellaran gum, ghatti gum, psyllium gum, quince gum, tamarind gum, locust bean gum, gum karaya, xantahn gum, gum tragacanth, proteins, Zein®, (a prolamine derived from corn), collagen, (extracted from animal connective tissue and bones), and derivatives thereof such as gelatin and glue, casein, (the principle protein in cow milk), sunflower protein, egg protein, soybean protein, vegetable gelatins, gluten, and the like and mixtures thereof. Thermoplastic starch may be produced, for example, as disclosed within U.S. Pat. No. 5,362,777. They disclose the mixing and heating of native or modified starch with high boiling plasticizers, such as glycerin or sorbitol, in such a way that the starch has little or no crystallinity, a low glass transition temperature and a low water content. Essentially any polymeric material known can be blended with the sulfonated aliphatic-aromatic polyesters.

The polymeric material to be blended with a sulfonated aliphatic-aromatic polyester can be added to the polyester at any stage during the polymerization of the polymer or after the polymerization is completed. For example, the polymeric materials can be added with the copolyester monomers at the start of the polymerization process. Alternatively, the polymeric material can be added at an intermediate stage of the polymerization, for example, as the precondensate passes into the polymerization vessel. As yet a further alternative, the polymeric material can be added after the copolyester exits the polymerizer. For example, the copolyester and the polymeric material can be melt fed to any intensive mixing operation, such as a static mixer or a single- or twin-screw extruder, and compounded with the polymeric material.

As yet a further method to produce blend of a copolyester and another polymeric material, the copolyester can be combined with the polymeric material in a postpolymerization process. Typically, such a process includes intensive mixing of the molten copolyester with the polymeric material. The intensive mixing can be provided by static mixers, Brabender mixers, single screw extruders, twin screw extruders and the like. In a typical process, the copolyester is dried. The polymeric material can also be dried. The dried copolyester can then be mixed with the polymeric material. Alternatively, the copolyester and the polymeric material can be co-fed through two different feeders. In an extrusion process, the copolyester and the polymeric material are typically fed into the back, feed section of the extruder. However, the copolyester and the polymeric material can be advantageously fed into two different locations of the extruder. For example, the copolyester can be added in the back, feed section of the extruder while the polymeric material is fed, ("side-stuffed"), in the front of the extruder near the die plate. The extruder temperature profile is set up to allow the copolyester to melt under the processing conditions. The screw design also provides stress and, in turn, heat, to the resin as it mixes the molten copolyester with the polymeric material. Alternatively, the polymeric material can be blended with the polyester materials during the formation of films and coatings, as described below.

The sulfonated aliphatic-aromatic copolyesters have been found to be useful in making a wide variety of shaped articles. When used to make shaped articles, the sulfonated aliphatic-aromatic copolyesters can optionally contain fillers. The shaped articles produced from the sulfonated aliphatic-aromatic copolyesters are found to have greater thermal properties than found for shaped articles produced from known sulfonated aliphatic-aromatic copolyesters. Shaped articles include film, sheets, fiber, melt blown containers, molded parts, such as cutlery, foamed parts, polymeric melt extrusion coatings onto substrates, polymeric solution coatings onto substrates and the like. The sulfonated aliphatic-aromatic copolyesters can be used in essentially any known process for forming shaped articles.

Polymeric films have a variety of uses, such as in packaging, especially of foodstuffs, adhesives tapes, insulators, capacitors, photographic development, x-ray development and as laminates. For some uses, the heat resistance of the film is an important factor. Therefore, a higher melting point, glass transition temperature, and degree of crystallinity are desirable to provide better heat resistance and more stable electrical characteristics, along with a desirably rapid biodegradation rate. Further, it is generally desired that the films have good barrier properties, including for example, moisture barrier, oxygen barrier and carbon dioxide barrier, good grease resistance, good tensile strength and a high elongation at break.

The sulfonated aliphatic-aromatic copolyesters can be formed into a film for use in a variety of different applications, such as food packaging, labels, dielectric insulation, a water vapor barrier or the like. While not limiting, the monomer composition of the copolyester polymer is preferably chosen to result in a partially crystalline polymer desirable for the formation of film, wherein the crystallinity provides strength and elasticity. As first produced, the polyester is generally semi-crystalline in structure. The crystallinity increases on reheating and/or stretching of the polymer, as occurs in the production of film.

The films can be made using any known process. For example, thin films can be formed by dipcoating as disclosed within U.S. Pat. No. 4,372,311, by compression molding as disclosed within U.S. Pat. No. 4,427,614, by melt extrusion as disclosed within U.S. Pat. No. 4,880,592, by melt blowing as disclosed within U.S. Pat. No. 5,525,281, or other art processes. The difference between a film and a sheet is the thickness, but there is no set industry standard as to when a film becomes a sheet As the term is used herein, a film is 0.25 mm (10 mils) thick or less, preferably between about 0.025 mm and 0.15 mm (1 mil and 6 mils). However, thicker films can be formed up to a thickness of about 0.50 mm (20 mils).

The film is preferably formed by either solution casting or extrusion. Extrusion is particularly preferred for formation of so-called "endless" products, such as films and sheets, which emerge as a continuous length. In extrusion, a polymeric material, whether provided as a molten polymer or as plastic pellets or granules, is fluidized and homogenized. Additives, as described above, such as thermal or UV stabilizers, plasticizers, fillers and/or blendable polymeric materials, can be added, if desired. The polymer containing any optional additives is then forced through a suitably shaped die to produce the desired cross-sectional film shape. The extruding force can be exerted by a piston or ram (ram extrusion), or by a rotating screw (screw extrusion), which operates within a cylinder in which the material is heated and plasticized and from which it is then extruded through the die in a continuous flow. Single screw, twin screw, and multi-screw extruders can be used. Different kinds of die are used to produce different products, such as blown film (formed by a blow head for blown extrusions), sheets and strips (slot dies) and hollow and solid sections (circular dies). In this manner, films of different widths and thickness can be produced. After extrusion, the polymeric film is taken up on rollers, cooled and taken off using suitable devices that are designed to prevent subsequent deformation of the film.

In an extrusion process, film can be produced by extruding a thin layer of polymer over chilled rolls and then further drawing down the film to size by tension rolls. In the extrusion casting process, the polymer melt is conveyed from the extruder through a slot die, (T-shaped or "coat hanger" die). The die can be as wide as 10 feet and typically has thick wall sections on the final lands to minimize deflection of the lips from internal pressure. Die opening sizes can be within a wide range, but 0.015 inch to 0.030 inch is typical. A nascent cast film is formed, which can be drawn down, and thinned significantly, depending on the speed of the rolls taking up the film. The film is then solidified by cooling below the crystalline melting point or glass transition temperature of the polymer, according to methods known to those skilled in the art. Cooling can be accomplished, for example, by passing the film through a water bath or over two or more chrome-plated chill rolls that have been cored for water cooling. The cast film is then conveyed though nip rolls, a slitter to trim the edges, and then wound up. In cast film, conditions can be tailored to allow a relatively high degree of orientation in the machine direction, especially at high draw down conditions and wind up speeds, and a much lower level of orientation in the transverse direction. Alternatively, the conditions can be tailored to minimize the level of orientation, thus providing films with essentially equivalent physical properties in both the machine direction and the transverse direction. Preferably, the finished film is 0.25 mm thick or less.

Blown film, which is generally stronger, tougher, and made more rapidly than cast film, is made by extruding a tube. In producing blown film, the flowing polymer melt is typically turned upward from the extruder and fed through an annular die. The melt flows around a mandrel and emerges through the ring-shaped opening in the form of a tube. As the tube leaves the die, internal pressure is applied through the die mandrel by the introduction of air, which expands the tube from about 1.5 to about 2.5 times the die diameter and simultaneously draws the film, causing a reduction in thickness. The air contained in the tube cannot escape because it is sealed by the die on one end and by nip (or pinch) rolls on the other. Desirably, an even air pressure is maintained to ensure uniform thickness of the film. The tubular filmcan be cooled internally and/or externally by directing air onto the film. Faster quenching in the blown film method can be accomplished by passing the expanded film about a cooled mandrel situated within the bubble. For example, one such method using a cooled mandrel is disclosed by Bunga, et al., in Canadian Patent 893,216. If the polymer that is being used to prepare blown film is semicrystalline, the bubble may become cloudy as it cools below the softening point of the polymer. Drawdown of the extrudate is not essential, but preferably the drawdown ratio is between 2 and 40. The draw down ratio is defined as the ratio of the die gap to the product of the thickness of the cooled film and the blow-up ratio, Draw down can be induced by tension from pinch rolls. Blow-up ratio is the ratio of the diameter of the cooled film bubble to the diameter of the circular die. The blow up ratio may be as great as 4 to 5, but 2.5 is more typical. The draw down induces molecular orientation with the film in the machine direction, (i.e.; direction of the extrudate flow), and the blow-up ratio induces molecular orientation in the film in the transverse or hoop direction. The quenched bubble moves upward through guiding devices into a set of pinch rolls, which flatten it. The resulting sleeve can subsequently be slit along one side, making a larger film width than could be conveniently made via the cast film method. The slit film can be further gusseted and surface-treated in line.

Alternatively, the blown film can be produced by more elaborate techniques, such as the double bubble, tape bubble, or trapped bubble processes. The double-bubble process is a technique in which the polymeric tube is first quenched and then reheated and oriented by inflating the polymeric tube above the glass transition temperature, (Tg), but below the crystalline melting temperature, (Tm), of the polyester, (if the polyester is crystalline). The double bubble technique has been described, for example, by Pahkle in U.S. Pat. No. 3,456,044.

The exact conditions used to produce blown film are determined by a variety of factors, such as the exact chemical composition of the polymer, the amount and type of additives, such as plasticizers, used, the thermal properties of the polymeric composition, and the like. However, the blown film process offers many advantages, such as the relative ease of changing the film width and caliber simply by changing the volume of air in the bubble and the speed of the screw, the elimination of end effects, and the capability of providing biaxial orientation in the as produced film. Typical film thicknesses from a blown film operation are in the range of about 0.004 to 0.008 inch and the flat film width may range up to 24 feet or larger after slitting.

For manufacturing large quantities of film, a sheeting catender can be employed. The rough film is fed into the gap of the calender, a machine comprising a number of heatable parallel cylindrical rollers that rotate in opposite directions and spread out the polymer and stretch it to the required thickness. The last roller smoothes the film thus produced. If the film is required to have a textured surface, the final roller is provided with an appropriate embossing pattern. Alternatively, the film can be reheated and then passed through an embossing calender. The calender is followed by one or more cooling drums. Finally, the finished film is reeled up.

Extruded films are also useful as starting materials for other products. For example, an extruded film can be cut into small segments for use as feed material for other processing methods, such as injection molding. As a further example, the film can be laminated onto a substrate as described below. As yet a further example, the films can be metallized. The film tubes available from blown film operations can be converted to bags by, for example, heat sealing processes.

The extrusion process can be combined with a variety of post-extruding operations for expanded versatility. Such post-forming operations include altering round to oval shapes, blowing the film to different dimensions, machining and punching, biaxial stretching and the like, as known to those skilled in the art.

A film can also be made by solution casting, which produces more consistently uniform gauge film than that made by melt extrusion. Solution casting comprises dissolving polymeric granules, powder or the like in a suitable solvent with any desired formulant, such as a plasticizer or colorant. The solution is filtered to remove dirt or large particles and cast from a slot die onto a moving belt, preferably of stainless steel, and dried, whereon the film cools. The extrudate thickness is five to ten times that of the finished film. The film can then be finished in a like manner to the extruded film. One skilled in the art can identify appropriate process parameters based on the polymeric composition and process used for film formation. The solution cast film can then be treated to the same post treatments as described for the extrusion cast film.

Multilayer films can also be produced, such as bilayer, trilayer, and multilayer films. One advantage to multilayer films is that specific properties can be tailored into the film to solve critical use needs while allowing the more costly ingredients to be relegated to the outer layers where they provide the greater needs. The multilayer film structures can be formed by coextrusion, blown film, dipcoating, solution coating, blade, puddle, air-knife, printing, Dahigren, gravure, powder coating, spraying, or other processes. Generally, the multilayer films are produced by extrusion casting processes. For example, the resin materials are heated in a uniform manner. The molten materials are conveyed to a coextrusion adapter that combines the molten materials to form a multilayer coextuded structure. The layered polymeric material is transferred through an extrusion die opened to a predetermined gap, commonly in the range of between about 0.05 inch (0.13 cm) and 0.012 inch (0.03 cm). The material is then drawn down to the intended gauge thickness by use of a primary chill or casting roll maintained typically in the temperature range of about 15 to 55 C., (60–130 F.). Typical draw down ratios range from about 5:1 to about 40:1. The additional layers can serve as barrier layers, adhesive layers, antiblocking layers, or for other purposes. Further, for example, the inner layers can be filled and the outer layers unfilled, as disclosed within U.S. Pat. No. 4,842,741 and U.S. Pat. No. 6,309,736. Production processes are disclosed, for example, in U.S. Pat. No. 3,748,962, U.S. Pat. No. 4,522,203, U.S. Pat. No. 4,734,324, U.S. Pat. No. 5,261,899 and U.S. Pat. No. 6,309,736. For example, El-Afandi, et al., in U.S. Pat. No. 5,849,374, U.S. Pat. No. 5,849,401, and U.S. Pat. No. 6,312,823, disclose compostable multilayer films with a core poly(lactide) layer with inner and outer layers of blocking reducing layers composed of, for example, aliphatic polyesters.

The additional layers can be made of the copolyesters and/or of materials that are biodegradable or not biodegradable. The materials can be naturally derived, modified naturally derived or synthetic.

Examples of biodegradable and nonbiodegradable materials suitable as additional layers are disclosed hereinabove for use in forming blends with the copolyesters. Examples of natural polymeric materials suitable as additional layers are also disclosed hereinabove for use in forming blends with the copolyesters. Additional layers can be formed from any other known suitable material.

Regardless of how the film is formed, it can be subjected to biaxial orientation by stretching in both the machine and transverse direction after formation. The machine direction stretch is initiated during formation of the film by the process of rolling out and taking up the film, which inherently stretches the film in the direction of take-up, orienting some of the fibers. Although machine-direction stretching strengthens the film in the machine direction, it allows the film to tear easily perpendicular to the machine direction because all of the fibers are oriented in one direction. Biaxial orientation provides superior performance in properties such as tensile strength, flexibility, toughness and shrinkability, in comparison to non-oriented films. It is desirable to stretch the film along two axes at right angles to each other, which increases tensile strength and elastic modulus in the directions of stretch. It is most desirable that the amount of stretch in each direction be approximately equivalent, thereby providing similar properties or behavior within the film when tested from any direction. However, for certain applications, such as those for which a particular amount of shrinkage or greater strength in one direction over another is desired, as in labels or adhesive and magnetic tapes, uneven, or uniaxial, orientation of the fibers of the film may be preferred.

Tentering, a process wherein a film is stretched while heating in the transverse direction simultaneously with, or subsequent to, stretching in the machine direction, is a preferred method for forming a biaxially oriented film. However, the biaxial orientation can be obtained by any known process, using available commercial equipment. For example, suitable equipment is available from Bruckner Maschenenbau of West Germany. One form of such equipment operates by clamping on the edges of the sheet to be drawn and, at the appropriate temperature, separating the edges of the sheet at a controlled rate. For example, a film may be fed into a temperature-controlled box, heated above its glass transition temperature and grasped on either side by tenterhooks that simultaneously exert a drawing tension (longitudinal stretching) and a widening tension (lateral stretching). Typically, stretch ratios of 3:1 to 4:1 may be employed. Alternatively, and preferably for commercial purposes, the biaxial drawing process is conducted continuously at high production rates in multistage roll drawing equipment, as available from Bruckner, where the drawing of the extruded film stock takes place in a series of steps between heated rolls rotating at different and increasing rates. When the appropriate combinations of draw temperatures and draw rates are employed, the monoaxial stretching is preferably from about 4 to about 20, more preferably from about 4 to about 10. Draw ratio is defined as the ratio of a particular dimension of a stretched film to that dimension in a non-stretched film. A biaxially oriented film can further be subjected to additional drawing of the film in the machine direction, in a process known as tensilizing.

Uniaxial orientation can be obtained by stretching the film in only one direction using the same procedures described above for biaxial orientation, or by directing the film through a machine direction orienter, ("MDO"), such as is commercially available from vendors such as the Marshall and Williams Company of Providence, Rhode Island. The MDO apparatus has a plurality of stretching rollers that progressively stretch and thin the film in the machine direction of the film.

Preferably, the stretching process is carried out at a temperature at least 10° C. above the glass transition temperature of the film material and preferably below the Vicat softening temperature of the film material, more preferably at least 10° C. below the Vicat softening point, the exact preferred temperature depending in part to the rate of stretching.

Orientation can be enhanced during blown film operations by adjusting the blow-up ratio, (BUR), which is the ratio of the diameter of the film bubble to the die diameter. For example, it is generally preferred to have a BUR of 1 to 5 for the production of bags or wraps. However, the 25 preferred BUR varies depending on the balance of properties desired in the film in the machine direction and the transverse direction. For a balanced film, a BUR of about 3:1 is generally appropriate. If it is desired to have a "splitty" film, one that easily tears in one direction, then a BUR of 1:1 to about 1.5:1 is generally preferred.

Shrinkage can be controlled by holding the film in a stretched position and heating for a few seconds before quenching. Heating stabilizes the oriented film, which can then only be forced to shrink only at temperatures above the heat stabilization temperature. Further, the film can also be subjected to rolling, calendering, coating, embossing, printing, or any other typical finishing operations known.

Preferred process conditions and parameters for film making by any method can be determined by a skilled artisan for any given polymeric composition and desired application.

The properties exhibited by a film depend on several factors indicated above, including the polymeric composition, the method of forming the polymer, the method of forming the film, and whether the film was treated for stretch or biaxially oriented. These factors affect a variety of properties of the film, such as shrinkage, tensile strength, elongation at break, impact strength, dielectric strength and constant, tensile modulus, chemical resistance, melting point, heat deflection temperature, and the like.

The film properties can be further adjusted by adding certain additives and fillers to the polymeric composition, such as colorants, dyes, UV and thermal stabilizers, antioxidants, plasticizers, lubricants antiblock agents, slip agents, and the like, as recited above. Alternatively, the sulfonated aliphatic-aromatic copolyesters can be blended with one or more other polymeric materials to improve certain characteristics, as described above.

As disclosed by Moss, in U.S. Pat. No. 4,698,372, Haffner, et al., in U.S. Pat. No. 6,045,900, and McCormack, in WO 95/16562, U.S. Pat. No. 4,626,252, U.S. Pat. No. 5,073,316, and U.S. Pat. No. 6,359,050, the films, and especially the filled films, can be formed so that they are microporous, if desired. The stretching of a filled film can create fine pores, which allows the film to serve as a barrier to liquids and particulate matter, yet allows air and water vapor to pass through.

To enhance the printability (ink receptivity) of the surface, adhesion or other desirable characteristics, the films can be treated by known, conventional post forming operations, such as corona discharge, chemical treatments, flame treatment, and the like.

The films comprising the sulfonated aliphatic-aromatic copolyesters are useful for a wide variety of applications. For example, the films are useful as a component of personal sanitary items, such as disposable diapers, incontinence briefs, feminine pads, sanitary napkins, tampons, tampon applicators, motion sickness bags, baby pants, personal absorbent products, and the like. The films combine water barrier properties, to avoid leak through, with toughness and the ability to easily conform to the body and to stretch with the body movements during use. After their use, the soiled articles will biocompost rapidly when discarded appropriately. As further examples, the films are useful as protective films for use in agriculture, such as mulch films, seed coverings, agriculture mats containing seeds, ("seed tapes"), garbage and lawn waste bags, and the like.

Further examples of uses for the films include adhesive tape substrates, bags, bag closures, bed sheets, bottles, cartons, dust bags, fabric softener sheets, garment bags, industrial bags, trash bags, waste bin liners, compost bags, labels, tags, pillow cases, bed liners, bedpan liners, bandages, boxes, handkerchiefs, pouches, wipes, protective clothing, surgical gowns, surgical sheets, surgical sponges, temporary enclosures, temporary siding, toys, wipes, and the like.

A particularly preferred use of the films comprising the sulfonated aliphatic-aromatic copolyesters is food packaging, especially fast food packaging, Specific examples of food packaging uses include fast food wrappers, stretch wrap films, hermetic seals, food bags, snack bags, grocery bags, cups, trays, cartons, boxes, bottles, crates, food packaging films, blister pack wrappers, skin packaging, and the like.

A specifically preferred packaging enduse for the films is in wraps. Wraps can be used to enclose meats, other perishable items, and especially fast food items, such as sandwiches, burgers, dessert items, and the like. Desirably, the films used as wraps combine a good balance of physical properties, including paper-like stiffness combined with sufficient toughness so as not to tear when used to wrap, for example, a sandwich; deadfold characteristics such that once folded, wrapped or otherwise manipulated into a desired shape, the wraps maintain their shape and do not tend to spontaneously unfold or unwrap; grease resistance, where desired; and provide a moisture barrier while not allowing moisture to condense onto an item contained in the wrap. The wraps may have smooth surface or a textured surface, such as by embossing, crimping, quilting, and the like. The wraps can be filled, with, for example, inorganic particles, organic particles such as starch, combinations of fillers and the like.

The films can be further processed to produce other articles, such as containers. For example, the films can be thermoformed as disclosed, for example, in U.S. Pat. No. 3,303,628, U.S. Pat. No. 3,674,626, and U.S. Pat. No. 5,011,735. The films can also be used to package foods, such as meats, by vacuum skin packaging techniques, as disclosed within, for example, U.S. Pat. No. 3,835,618, U.S. Pat. No. 3,950,919, U.S. Re. Pat. No. 30,009, and U.S. Pat. No. 5,011,735. The films can further be laminated onto substrates, as described below.

In another preferred embodiment, the sulfonated aliphatic-aromatic copolyesters can be used as coatings on substrates. Also provided are processes for producing the coatings and coated substrates, and articles derived therefrom. Coatings can be produced by coating a substrate with polymer solutions, dispersions, latexes, and/or emulsions of the copolyesters by rolling, spreading, spraying, brushing, or pouring processes, followed by drying, by coextruding the copolyesters with other materials, powder coating onto a preformed substrate, or by melt/extrusion coating a preformed substrate with the copolyesters. The substrate can be coated on one side or on both or all sides with the copolyesters. Substrates coated with the copolyesters have a variety of uses, such as in packaging, especially of foodstuffs, and as disposable cups, plates, bowls and cutlery. For many uses, the heat resistance of the coating is an important factor. Therefore, a higher melting point, glass transition temperature, and crystallinity level are desirable to provide better heat resistance, along with a rapid biodegradation rate. Further, it is desired that the coatings provide good barrier properties for moisture, grease, oxygen, and carbon dioxide, and have good tensile strength and a high elongation at break.

Coatings be made from the copolyesters using known processes. For example, thin coatings can be formed by dipcoating as disclosed within U.S. Pat. No. 4,372,311 and U.S. Pat. No. 4,503,098, extrusion onto substrates, as disclosed, for example, in U.S. Pat. No. 5,294,483, U.S. Pat. No. 5,475,080, U.S. Pat. No. 5,611,859, U.S. Pat. No. 5,795,320, U.S. Pat. No. 6,183,814, and U.S. Pat. No. 6,197,380, blade, puddle, air-knife, printing, Dahlgren, gravure, powder coating, spraying, or other processes. The coatings can be of any thickness, depending upon the intended application in which a coated substrate is to be used. Preferably, the polymeric coating will be less than or equal to 0.25 mm (10 mils) thick, more preferably between about 0.025 mm and 0.15 mm (1 mil and 6 mils). However, thicker coatings can be formed up to a thickness of about 0.50 mm (20 mils) or greater.

Various substrates can be coated directly with a film. The coating is preferably formed by solution, dispersion, latex, or emulsion casting, powder coating, or extrusion onto a preformed substrate.

A coating can also be made by solution casting onto a substrate, which produces more consistently uniform gauge coatings than melt extrusion. Solution casting comprises dissolving polymeric granules, powder or the like in a suitable solvent with any desired formulant, such as a plasticizers, filler, blendable polymeric material, or colorant. The solution is filtered to remove dirt and/or large particles and cast from a slot die onto a moving preformed substrate, and dried, whereupon the coating cools. The extrudate thickness is five to ten times that of the finished coating. The coating can then be finished in a like manner to the extruded coating. Polymeric dispersions and emulsions can be coated onto substrates by equivalent processes. Coatings can be applied to textiles, nonwovens, foil, paper, paperboard, and other sheet materials by continuously operating spread-coating machines. A coating knife, such as a "doctor knife", allows uniform spreading of the coating materials (in the form of solution, emulsions, or dispersions in water or an organic medium) onto a substrate that is moved along by rollers. The coating is then dried. Alternatively, the polymeric solution, emulsion, or dispersion can be sprayed, brushed, rolled or poured onto the substrate.

For example, Potts, in U.S. Pat. No. 4,372,311 and U.S. Pat. No. 4,503,098, discloses coating water-soluble substrates with solutions of water-insoluble materials. For example, U.S. Pat. No. 3,378,424 discloses processes for coating a fibrous substrate with an aqueous polymeric emulsion.

A coating of the copolyesters can also be applied to substrates by powder coating processes. In a powder coating process, a polymer is coated onto a substrate in the form of a powder having a fine particle size. The substrate to be coated can be heated to above the fusion temperature of the polymer and the substrate is dipped into a bed of the powdered polymer fluidized by the passage of air through a porous plate. The fluidized bed is typically not heated. A layer of the polymer adheres to the hot substrate surface and melts to provide the coating. Coating thicknesses can be in the range of about 0.005 inch to 0.080 inch, (0.13 to 2.00 mm). Other powder coating processes include spray coating, wherein the substrate is not heated until after it is coated, and electrostatic coating. For example, paperboard containers can be electrostatically spray-coated with a thermoplastic polymer powder, as disclosed within U.S. Pat. No. 4,117,971, U.S. Pat. No. 4,168,676, U.S. Pat. No. 4,180,844, U.S. Pat. No. 4,211,339, and U.S. Pat. No. 4,283,189. The cups are then heated, causing the polymeric powder to melt to form a laminated polymeric coating.

Metal articles of complex shape can also be coated with a polymeric film using a whirl sintering process. The articles, heated to above the melting point of the polymer are introduced into a fluidized bed of powdered polymer wherein the polymer particles are held in suspension by a rising stream of air, thus depositing a coating on the metal by sintering.

A coating of the copolyesters can also be applied by spraying molten, atomized copolyester onto a substrate, such as paperboard. Such processes are disclosed for wax coatings in, for example, U.S. Pat. No. 5,078,313, U.S. Pat. No. 5,281,446, and U.S. Pat. No. 5,456,754.

The coatings are preferably formed by melt or extrusion coating processes. Extrusion is particularly preferred for formation of "endless" products, such as coated paper and paperboard, which emerge as a continuous length. In extrusion, a polymeric material, whether provided as a molten polymer or as plastic pellets or granules, is fluidized and homogenized. Additives, as described above, such as thermal or UV stabilizers, plasticizers, fillers and/or blendable polymeric materials, can be added during extrusion. The polymeric material containing the additives is then forced through a suitably shaped die to produce the desired cross-sectional film shape. The extruding force can be exerted by a piston or ram (ram extrusion), or by a rotating screw (screw extrusion), which operates within a cylinder in which the material is heated and plasticized and from which it is then extruded through the die in a continuous flow. Single screw, twin screw, and multi-screw extruders can be used. Different kinds of die are used to produce different products. Typically slot dies, such as T-shaped or "coat hanger" dies, are used for extrusion coatings. In this manner, films of different widths and thickness can be produced and can be extruded directly onto the substrate to be coated. A molten nascent film exits the die and is pulled down onto the substrate and into a nip between a chill roll and a pressure roll situated directly below the die. Typically the nip rolls are a pair of cooperating, axially parallel rolls, one being a pressure roll having a rubber surface and the other being a chill roll. Typically the uncoated side of the substrate contacts the pressure roll while the polymer-coated side of the substrate contacts the chill roll. The pressure between the two rolls forces the film onto the substrate. At the same time, the substrate is moving at a speed faster than the extruded film and is drawing the film down to the required thickness. In extrusion coating, the substrate (e.g., paper, foil, fabric, polymeric film) is compressed together with the extruded polymeric melt by means of the pressure rolls so that the polymer impregnates the substrate for maximum adhesion. The molten film is then cooled by the water-cooled, chromium-plated chill rolls. The coated substrate can then be passed through a slitter to trim the edges and taken off by means of suitable devices designed to prevent subsequent deformation of the coated substrate. Extrusion coating of polyesters onto paperboard is disclosed, for example, in U.S. Pat. No. 3,924,013, which discloses the formation of ovenable trays mechanically formed from paperboard previously laminated with polyester; in U.S. Pat. No. 4,836,400, which discloses the production of cups formed from paper stock that has been coated with a polymer on both sides; and in U.S. Pat. No. 5,294,483, disclose the extrusion coating of certain polyesters onto paper substrates. As a further example of extrusion coating, wires and cable can be sheathed directly with polymeric films extruded from oblique heads.

Calendering processes can also be used to produce polymeric laminates onto substrates. Calenders consist of two, three, four, or five hollow rolls arranged for steam heating or water cooling. Typically, the polymer to be calendered is softened, for example in ribbon blenders, such as a Banbury mixer. Other components be mixed in, such as plasticizers. The softened polymeric composition is then fed to the roller arrangement and is squeezed into the form of films. If desired, thick sections can be formed by applying one layer of polymer onto a previous layer (double plying). The substrate, such as textile and nonwoven fabrics and paper, is fed through the last two rolls of the calender so that the resin film is pressed into the substrate. The thickness of the laminate is determined by the gap between the last two rolls of the calender. The surface can be made glossy, matt, or embossed. The laminate is then cooled and wound up on rolls.

Multiple polymer layers, such as bilayer, trilayer, and multilayer film structures, can also be coated onto substrates. One advantage to multilayer films is that specific properties can be tailored into the film to solve critical use needs while allowing the more costly ingredients to be relegated to the outer layers to provide more critical properties. The multilayer composite structures can be formed by coextrusion, dipcoating solution coating, blade, puddle, air-knife, printing, Dahigren, gravure, powder coating, spraying, or other known processes. Generally, the multilayer films are produced by extrusion casting processes. For example, the resin materials are heated in a uniform manner. The molten materials are conveyed to a coextrusion adapter that combines the molten materials to form a multilayer coextuded structure. The layered polymeric material is transferred through an extrusion die opened to a predetermined gap, commonly in the range of between about 0.05 inch (0.13 cm) and 0.012 inch (0.03 cm) and is pulled down onto a substrate and into a nip between a chill roll and a pressure roll situated directly below the die. The material is drawn down to the intended gauge thickness based on the speed of the substrate. The primary chill or casting roll is maintained typically at a temperature in the range of about 15 to 55 C, (60–130 F). Typical draw down ratios range from about 5:1 to about 40:1. The additional layers can serve as barrier layers, adhesive layers, antiblocking layers, or for other purposes. Further, for example, the inner layers may be filled and the outer layers may be unfilled, as disclosed within U.S. Pat. No. 4,842,741 and U.S. Pat. No. 6,309,736. Production processes are disclosed, for example, in U.S. Pat. No. 5,849,374, U.S. Pat. No. 5,849,401, and U.S. Pat. No. 6,312,823, which disclose compostable multilayer films with a core poly(lactide) layer with inner and outer layers of blocking reducing layers composed of, for example, aliphatic polyesters, and in WO Application 00/01530, which discloses paper and paperboard coated with poly(lactide) and biodegradable adhesive layers, such as aliphatic-aromatic polyesters.

Additional layers in multilayer structures can contain the sulfonated aliphatic-aromatic copolyesters and/or other materials that are biodegradable or not biodegradable, naturally derived, modifed naturally derived or synthetic. Examples of biodegradable and nonbiodegradable materials suitable in forming additional layers are disclosed hereinabove. Examples of natural polymeric materials suitable as additional layers are also disclosed hereinabove. Essentially any known materials can be used as an additional layer.

Generally, the coating is applied to a thickness of between about 0.2 to 15 mils, more generally in the range of between 0.5 to 2 mils. The substrates may vary widely in thickness, but the range of between 0.5 to more than 24 mils thickness is common.

Suitable substrates for the present invention include articles composed of paper, paperboard, cardboard, fiberboard, cellulose, such as Cellophane®, starch, plastic, polystyrene foam, glass, metal, for example; aluminum or tin cans, metal foils, polymeric foams, organic foams, inorganic foams, organic-inorganic foams, polymeric films, and the like.

Preferred are biodegradable substrates, such as paper, paperboard, cardboard, cellulose, starch and the like and biobenign substrates such as inorganic and inorganic-organic foams.

Polymeric films suitable as substrates within the present invention can contain the copolyesters and/or other materials that are biodegradable or not biodegradable. The materials can be naturally derived, modifed naturally derived or synthetic. Examples of biodegradable and nonbiodegradable materials suitable as substrates are disclosed hereinabove for use in forming blends with the copolyesters. Examples of natural polymeric materials suitable as substrates are also disclosed hereinabove for use in forming blends with the copolyesters.

Organic foams, such as derived from expanded starches and grains, can be used as substrates. Such materials are disclosed, for example, in U.S. Pat. No. 3,137,592, U.S. Pat. No. 4,673,438, U.S. Pat. No. 4,863,655, U.S. Pat. No. 5,035,930, U.S. Pat. No. 5,043,196, U.S. Pat. No. 5,095,054, U.S. Pat. No. 5,300,333, U.S. Pat. No. 5,413,855, U.S. Pat. No. 5,512,090, and U.S. Pat. No. 6,106,753. Specific examples of the materials include; EcoFoam®, a product of the National Starch Company of Bridgewater, N.J., which is a hydroxypropylated starch product, and EnviroFil®, a product of the EnPac Company, a DuPont-Con Agra Company.

Exemplary preferred organic-inorganic foams are cellular foams containing relatively high levels of inorganic fillers such as calcium carbonate, clays, cement, or limestone, and having a starch-based binder, such as, for example, potato starch, corn starch, waxy corn starch, rice starch, wheat starch, tapioca, and the like, and a small amount of fiber, as disclosed, for example, by Andersen, et al., in U.S. Pat. No. 6,030,673. Such materials can produced by mixing the ingredients together, such as limestone, potato starch, fiber and water, to from a batter. A substrate is formed by pressing the batter between two heated molds. The water contained within the batter is turned to steam, raising the pressure within the mold and resulting in foaming of the substrate. Products produced by the process are commercially available from the EarthShell Packaging Company. Products include 9-inch plates, 12-ounce bowls and hinged-lid sandwich and salad containers, ("clam shells"). Such products can be used as substrates and coated with the copolyesters disclosed herein. Other known foamed and foamable substrates can be used.

To enhance the coating process, the substrates can be treated using known, conventional post forming operations, such as corona discharge, chemical treatments such as primers, flame treatments, adhesives, and the like. The substrate layer can be primed with, for example, an aqueous solution of polyethyleneimine, (Adcote® 313), or a styrene-acrylic latex, or may be flame treated, as disclosed within U.S. Pat. No. 4,957,578 and U.S. Pat. No. 5,868,309.

The substrate can be coated with an adhesive, before being coated by the polyester, by conventional coating technologies or by extrusion. Specific examples of adhesives that can be used include; glue, gelatine, casein, starch, cellulose esters, aliphatic polyesters, poly(alkanoates), aliphatic-aromatic polyesters, sulfonated aliphatic-aromatic polyesters, polyamide esters, rosin/polycaprolactone triblock copolymers, rosin/poly(ethylene adipate) triblock copolymers, rosin/poly(ethylene succinate) triblock copolymers, poly(vinyl acetates), poly(ethylene-co-vinyl acetate), poly(ethylene-co-ethyl acrylate), poly(ethylene-co-methyl acrylate), poly(ethylene-co-propylene), poly (ethylene-co-1-butene), poly(ethylene-co-1-pentene), poly (styrene), acrylics, Rhoplex® N-1031, (an acrylic latex from the Rohm & Haas Company), polyurethanes, AS 390, (an aqueous polyurethane adhesive base for Adhesion Systems, Inc.) with AS 316, (an adhesion catalyst from Adhesion Systems, Inc.), Airflex® 421, (a water-based vinyl acetate adhesive formulated with a crosslinking agent), sulfonated polyester urethane dispersions, (such as sold as Dispercoll® U-54, Dispercoll® U-53, and Dispercoll® KA-8756 by the Bayer Corporation), nonsulfonated urethane dispersions, (such as Aquathane® 97949 and Aquathane® 97959 by the Reichold Company; Flexthane® 620 and Flexthane® 630 by the Air Products Company; Luphen® D DS 3418 and Luphen® D 200A by the BASF Corporation; Neorez® 9617 and Neorez® 9437 by the Zeneca Resins Company; Quilastic® DEP 170 and Quilastic® 172 by the Merquinsa Company; Sancure® 1601 and Sancure® 815 by the B. F. Goodrich Company), urethane-styrene polymer dispersions, (such as Flexthane® 790 and Flexthane® 791 of the Air Products & Chemicals Company), Non-ionic polyester urethane dispersions, (such as Neorez® 9249 of the Zeneca Resins Company), acrylic dispersions, (such as Jagotex® KEA-5050 and Jagotex® KEA 5040 by the Jager Company; Hycar® 26084, Hycar® 26091, Hycar® 26315, Hycar® 26447, Hycar® 26450, and Hycar® 26373 by the B. F. Goodrich Company; Rhoplex® AC-264, Rhoplex® HA-16, Rhoplex® B-60A, Rhoplex® AC-234, Rhoplex® E-358, and Rhoplex® N-619 by the Rohm & Haas Company), silanated anionic acrylate-styrene polymer dispersions, (such as Acronal® S-710 by the BASF Corporation and Texigel® 13-057 by Scott Bader Inc.), anionic acrylate-styrene dispersions, (such as Acronal(®296D, Acronal® NX 4786, Acronal® S-305D, Acronal® S-400, Acronal® S-610, Acronal® S-702, Acronal® S-714, Acronal® S-728, and Acronal® S-760 by the BASF Corporation; Carboset® CR-760 by the B. F. Goodrich Company;

Rhoplex® P-376, Rhoplex® P-308, and Rhoplex® NW-1715K by the Rohm & Haas Company; Synthemul® 40402 and Synthemul® 40403 by the Reichold Chemicals Company; Texigel® 13-57 Texigel® 13-034, and Texigel® 13-031 by Scott Bader Inc.; and Vancryl® 954, Vancryl® 937 and Vancryl® 989 by the Air Products & Chemicals Company), anionic acrylate-styrene-acrylonitrile dispersions, (such as Acronal® S 886S, Acronal® S 504, and Acronal® DS 2285 X by the BASF Corporation), acrylate-acrylonitrile dispersions, (such as Acronal® 35D, Acronal® 81D, Acronal® B 37D, Acronal® DS 3390, and Acronal® V275 by the BASF Corporation), vinyl chloride-ethylene emulsions, (such as Vancryl® 600, Vancryl® 605, Vancryl® 610, and Vancryl® 635 by Air Products and Chemicals Inc.), vinylpyrrolidone/styrene copolymer emulsions, (such as Polectron® 430 by ISP Chemicals), carboxylated and noncarboxylated vinyl acetate ethylene dispersions, (such as Airflex® 420, Airflex® 421, Airflex® 426, Airflex® 7200, and Airflex® A-7216 by Air Products and Chemicals Inc. and Dur-o-set® E150 and Dur-o-se® E-230 by ICI), vinyl acetate homopolymer dispersions, (such as Resyn® 68-5799 and Resyn® 25-2828 by ICI), polyvinyl chloride emulsions, (such as Vycar® 460×24, Vycar® 460×6 and Vycar® 460×58 by the B. F. Goodrich Company), polyvinylidene fluoride dispersions, (such as Kynar® 32 by Elf Atochem), ethylene acrylic acid dispersions, (such as Adcote® 50T4990 and Adcote® 50T4983 by Morton International), polyamide dispersions, (such as Micromid 121RC, Micromid®D 141L, Micromid® 142LTL, Micromid® 143LTL, Micromid® 144LTL, Micromid® 321RC, and Micromid® 632HPL by the Union Camp Corporation), anionic carboxylated or noncarboxylated acrylonitrile-butadiene-styrene emulsions and acrylonitrile emulsions, (such as Hycar® 1552, Hycar® 1562×107, Hycar® 1562×117 and Hycar® 1572×64 by B. F. Goodrich), resin dispersions derived from styrene, (such as Tacolyn® 5001 and Piccotex® LC-55WK by Hercules), resin dispersions derived from aliphatic and/or aromatic hydrocarbons, (such as Escorez®9191, Escorez® 9241, and Escorez® 9271 by Exxon), styrene-maleic anhydrides, (such as SMA® 1440 H and SMA® 1000 by AtoChem), and the like and mixtures thereof. Preferably, the substrate is coated with a biodegradable adhesion binder layer such as, for example, glue, gelatine, casein, starch, and the like. However, any known adhesive can be used. The adhesives can be applied by melt processes or by solution, emulsion, or dispersion coating processes.

For example, U.S. Pat. No. 4,343,858, discloses a coated paperboard formed by the coextrusion of a polyester top film and an intermediate layer of an ester of acrylic acid, methacrylic acid, or ethacrylic acid, on paperboard. U.S. Pat. No. 4,455,184, discloses a process to coextrude a polyester layer and a polymeric adhesive layer onto a paperboard substrate. Fujita, et al., in U.S. Pat. No. 4,543,280, disclose the use of adhesives in the extrusion coating of polyester onto ovenable paperboard. Huffman, et al., in U.S. Pat. No. 4,957,578, disclose the extrusion of a polyester layer on a polyethylene coated paperboard, and the direct formation of a coated structure by coextrusion of the polyethylene layer on the paperboard with the polyester on the polyethylene with a coextruded adhesive tie layer of Bynel® between the polyethylene layer and the polyester layer.

One of ordinary skill in the art will be able to identify appropriate process parameters based on the polymeric composition and process used for the coating formation. Process conditions and parameters for making coatings by any method in the art can be determined by a skilled artisan for a given polymeric composition and desired application.

The properties exhibited by a coating will depend on several factors indicated above, including the polymeric composition, the method of forming the polymer, the method of forming the coating, and whether the coating was oriented during manufacture. These factors affect many properties of the coating, such as shrinkage, tensile strength, elongation at break, impact strength, dielectric strength and constant, tensile modulus, chemical resistance, melting point, heat deflection temperature, and the like.

Some coating properties can also be adjusted by adding certain additives and fillers to the copolyester, such as colorants, dyes, UV and thermal stabilizers, antioxidants, plasticizers, lubricants antiblock agents, slip agents, and the like, as recited above. Alternatively, the sulfonated aliphatic-aromatic copolyesters can be blended with one or more other polymeric materials to improve certain characteristics, as described above.

Substrates can be formed into articles prior to coating or after they are coated. For example, containers can be produced from flat, coated paperboard by pressforming, by vacuum forming, or by folding and adhering them into the final desired shape. Coated, flat paperboard stock can be formed into trays by the application of heat and pressure, as disclosed within, for example, U.S. Pat. No. 4,900,594, or vacuum formed into containers for foods and beverages, as disclosed within U.S. Pat. No. 5,294,483. Other articles include, for example, cutlery, flower pots, mailing tubes, light fixtures, ash trays, gameboards, food containers, fast food containers, cartons, boxes, milk cartons, fruitjuice containers, carriers for beverage containers, ice cream cartons, cups, disposable drinking cups, two-piece cups, one-piece pleated cups, cone cups, coffee cups, lidding, lids, straws, cup tops, french fry containers, fast food carry out boxes, packaging, support boxes, confectionery boxes, boxes for cosmetics, plates, bowls, vending plates, pie plates, trays, baking trays, breakfast plates, microwavable dinner trays, "TV" dinner trays, egg cartons, meat packaging platters, disposable single use liners which can be utilized with containers such as cups or food containers, substantially spherical objects, bottles, jars, crates, dishes, medicine vials, interior packaging, such as partitions, liners, anchor pads, corner braces, corner protectors, clearance pads, hinged sheets, trays, funnels, cushioning materials, and other objects used in packaging, storing, shipping, portioning, serving, or dispensing an object within a container.

Water-resistant polymer coated paper and paperboard are commonly used in packaging material for foodstuffs and as disposable containers. Coating polymers and multilamellar coating structures including the same have been developed that give to the package desired oxygen barrier, water vapor barrier, and aroma tightness properties for preservation of the packaged product.

The coatings comprising the sulfonated aliphatic-aromatic copolyesters are useful in a wide variety of applications. For example, the coatings can be used as a component of personal sanitary items, such as disposable diapers, incontinence briefs, feminine pads, sanitary napkins, tampons, tampon applicators, motion sickness bags, baby pants, personal absorbent products, and the like. The coatings combine water barrier properties, to avoid leak through with toughness to easily conform to the body and to stretch with the body movements during use. After their use, the soiled articles will biocompost when discarded appropriately. The coatings are also useful as protective films for use in agriculture, such as mulch films, seed coverings, agriculture mats containing seeds, ("seed tapes"), garbage and lawn waste bags, and the like. Further examples of uses for the coatings include adhesive tape substrates, bags, bag closures, bed sheets, bottles, cartons, dust bags, fabric softener sheets, garment bags, industrial bags, trash bags, waste bin liners, compost bags, labels, tags, pillow cases, bed liners, bedpan liners, bandages, boxes, handkerchiefs, pouches, wipes, protective clothing, surgical gowns, surgical sheets, surgical sponges, temporary enclosures, temporary siding, toys, wipes, and the like.

A particularly preferred use of the coatings comprising the sulfonated aliphatic-aromatic copolyesters is in food packaging, especially for fast food packaging. Specific examples of food packaging uses include fast food wrappers, stretch wrap films, hermetic seals, food bags, snack bags, grocery bags, cups, trays, cartons, boxes, bottles, crates, food packaging films, blister pack wrappers, skin packaging, hinged lid sandwich and salad containers, ("clam shells"), and the like.

A specifically preferred packaging enduse for the coatings includes wraps. Coated wraps can be in the form of a polymeric coated paper. Wraps can be used to enclose meats, other perishable items, and especially fast food items, such as sandwiches, burgers, dessert items, and the like. Desirably, the coatings used in making wraps provide a balance of physical properties, including paper-like stiffness combined with sufficient toughness so as not to tear when used to wrap, for example, a sandwich; deadfold characteristics, so that once folded, wrapped or otherwise manipulated into the desired shape, the wraps will maintain their shape and not tend to spontaneously unfold or unwrap, good grease resistance, where desired, and a moisture barrier while not allowing for moisture to condense onto an item wrapped therein. The wraps can have smooth surface or a textured surface, such as by embossing, crimping, quilting, and the like. The coating on the wraps can be filled, with, for example, inorganic particles, organic particles, such as starch, combinations of fillers and the like.

In other preferred embodiments the sulfonated aliphatic-aromatic copolyesters can be laminated onto substrates. Films comprising the sulfonated aliphatic-aromatic copolyesters, prepared as described above, can be laminated onto a wide variety of substrates by known processes, such as for example; thermoforming, vacuum thermoforming, vacuum lamination, pressure lamination, mechanical lamination, skin packaging, and adhesion lamination. A laminate is differentiated from a coating in that, in lamination, a preformed film is attached to a substrate. The substrate can be shaped into the final use shape, such as in the form of a plate, cup, bowl, tray, and the like, prior to lamination, or may be laminated when in an intermediate shape still to be formed, such as a sheet or film. The film can be attached to the substrate by the application of heat and/or pressure, as with, for example heated bonding rolls. Generally speaking, the laminate bond strength or peel strength can be enhanced by the use of higher temperatures and/or pressures. When adhesives are used, the adhesives can be hot melt adhesives or solvent based adhesives. To enhance the lamination process, the films and/or the substrates may be treated by known, conventional post forming operations, such as corona discharge, chemical treatments, such as primers, flame treatments, as previously described. For example, U.S. Pat. No. 4,147,836 describes subjecting a paperboard to a corona discharge to is enhance the lamination process with a poly(ethylene terephthalate) film. For example, Quick, et al., in U.S. Pat. No. 4,900,594, disclose the corona treatment of a polyester film to aide in the lamination to paperstock with adhesives. For example, Schirmer, in U.S. Pat. No. 5,011,735, discloses the use of corona treatments to aid the adhesion between various blown films. For example, U.S. Pat. No. 5,679,201 and U.S. Pat. No. 6,071,577, disclose the use of flame treatments to aid in the adhesion within polymeric lamination processes. For example, Sandstrom, et al., in U.S. Pat. No. 5,868,309, disclose the use of paperboard substrate primer consisting of certain styrene-acrylic materials to improve the adhesion with polymeric laminates.

Processes for producing polymeric coated or laminated paper and paperboard substrates for use as containers and cartons is well known, and are disclosed, for example, in U.S. Pat. No. 3,863,832, U.S. Pat. No. 3,866,816, U.S. Pat. No. 4,337,116, U.S. Pat. No. 4,456,164, U.S. Pat. No. 4,698,246, U.S. Pat. No. 4,701,360, U.S. Pat. No. 4,789,575, U.S. Pat. No. 4,806,399, U.S. Pat. No. 4,888,222, and U.S. Pat. No. 5,002,833. Kane, in U.S. Pat. No. 3,924,013, discloses the formation of ovenable trays mechanically formed from paperboard previously laminated with polyester. Schmidt, in U.S. Pat. No. 4,130,234, discloses the polymeric film lamination of paper cups. The lamination of films onto nonwoven fabrics is disclosed within U.S. Pat. No. 6,045,900 and U.S. Pat. No. 6,309,736. Depending on the intended use of the polyester laminated substrate, the substrate can be laminated on one side or on both sides.

The films can be passed through heating and pressure/nip rolls to be laminated onto flat substrates. More commonly, the films are laminated onto substrates utilizing processes that are derivatives of thermoforming. As such, the films can be laminated onto substrates by vacuum lamination, pressure lamination, blow lamination, mechanical lamination, and the like. When the films are heated, they soften and can be stretched onto a substrate of any given shape. Processes for adhering a polymeric film to a preformed substrate are known, for example, as disclosed within U.S. Pat. No. 2,590,221.

In vacuum lamination, the film can be clamped or otherwise held against the substrate and then heated until it becomes soft. A vacuum is then applied, typically through porous substrates or designed-in holes, causing the softened film to mold into the contours of the substrate and laminate onto the substrates. The laminate is then cooled. The vacuum can be maintained or not during the cooling process.

For substrate shapes that require a deep draw, such as cups, deep bowls, boxes, cartons, and the like, a plug assist can be utilized. In such substrate shapes, the softened film tends to thin out significantly before it reaches the base or bottom of the substrate shape, leaving only a thin and weak laminate on the bottom of the substrate shape. A plug assist is any type of mechanical helper that carries more film stock toward an area of the substrate shape where the lamination would otherwise be too thin. Plug assist techniques can be adapted to vacuum and pressure lamination processes.

Vacuum lamination processes of films onto preformed substrates are disclosed, for example, in U.S. Pat. No. 4,611,456 and U.S. Pat. No. 4,862,671. U.S. Pat. No. 3,932,105, discloses processes for the vacuum lamination of a film onto a folded paperboard carton. U.S. Pat. No. 3,957,558, disclose the vacuum lamination of thermoplastic films onto a molded pulp product, such as a plate. U.S. Pat. No. 4,337,116, disclose the lamination of poly(ethylene terephthalate) films onto preformed molded pulp containers by preheating the pulp container and the film, pressing the film into contact with the substrate and applying vacuum through the molded pulp container substrate. Plug assisted, vacuum lamination processes are also known. U.S. Pat. No. 4,124,434, disclose such processes for deep drawn laminates, such as coated cups. U.S. Pat. No. 4,200,481 and U.S. Pat. No. 4,257,530 disclose the production of lined trays by such processes.

In pressure lamination, the film can be clamped, heated until it softens, and then forced into the contours of the substrate to be laminated by air pressure being applied to the side of the film opposite to the substrate. Exhaust holes if present can allow the trapped air to escape, or in the more common situation, the substrate is porous to air and the air simply escapes through the substrate. The air pressure can be released once the laminated substrate cools and the film solidifies. Pressure lamination tends to allow a faster production cycle, improved part definition and greater dimensional control over vacuum lamination.

Pressure lamination of films onto preformed substrates is disclosed, for example, in U.S. Pat. No. 3,657,044 and U.S. Pat. No. 4,862,671. U.S. Pat. No. 4,092,201, discloses a process for lining an air-permeable container, such as a paper cup, with a thermoplastic foil by use of a warm pressurized stream of gas.

Mechanical lamination includes any lamination method that does not use vacuum or air pressure. In this method, the film is heated and then mechanically applied to the substrate. Examples of the mechanical application include molds and pressure rolls.

Suitable substrates for lamination include articles composed of paper, paperboard, cardboard, fiberboard, cellulose, such as Cellophane®, starch, plastic, polystyrene foam, glass, metal, for example; aluminum or tin cans, metal foils, polymeric foams, organic foams, inorganic foams, organic-inorganic foams, polymeric films, and the like. Preferred are biodegradable substrates, such as paper, paperboard, cardboard, cellulose, starch and the like and biobenign substrates such as inorganic and inorganic-organic foams. Polymeric films that are suitable as substrates within the present invention can include the sulfonated aliphatic-aromatic copolyesters or other materials that are biodegradable or not biodegradable. The materials may be naturally derived, modifed naturally derived or synthetic.

Examples of biodegradable and nonbiodegradable materials suitable as substrates are disclosed hereinabove. Examples of natural polymeric materials suitable as substrates are also disclosed hereinabove.

Organic foams, inorganic foams, and organic-inorganic foams suitable for lamination are disclosed hereinabove for use as coated substrates.

The substrates can be formed into their final shape prior to lamination. Any conventional process to form the substrates may be used. For example, for molded pulp substrates, a "precision molding", "die-drying", and "close-drying" process can be used. The processes include molding fibrous pulp from an aqueous slurry against a screen-covered open-face suction mold to the substantially finished contoured shape, followed by drying the damp pre-form under a strong pressure applied by a mated pair of heated dies. Such processes are disclosed, for example, in U.S. Pat. No. 2,183,869, U.S. Pat. No. 4,337,116, and U.S. Pat. No. 4,456,164. Disposable paper plates produced by such processes have been sold under the "Chinet" tradename by the Huhtamaki Company.

Molded pulp substrates can also be produced by known "free-dried" or "open-dried" processes. The free-dried process includes molding fibrous pulp from an aqueous slurry against a screen-covered, open-face suction mold to a preform in substantially the final molded shape and then drying the damp pre-from in a free space, such as placing it on a conveyor, and moving it slowly through a heated drying oven. Molded pulp substrates can be "after pressed" after forming by a free-dried process, for example, as disclosed within U.S. Pat. No. 2,704,493, or by other processes, such as described, for example, in U.S. Pat. No. 3,185,370.

The laminated substrates can be converted to the final shape by known processes, such a press forming or folding up. Such processes are disclosed, for example in U.S. Pat. No. 3,924,013, 4,026,458, and U.S. Pat. No. 4,456,164. U.S. Pat. No. 4,900,594, discloses the production of trays from flat, polyester laminated paperstock by the use of pressure and heat.

Adhesives can be applied to the film, to the substrate or to the film and the substrate to enhance the bond strength of the laminate. Adhesive lamination of films onto preformed substrates is disclosed, for example, within U.S. Pat. No. 2,434,106, U.S. Pat. No. 2,510,908, U.S. Pat. No. 2,628,180, U.S. Pat. No. 2,917,217, U.S. Pat. No. 2,975,093, U.S. Pat. No. 3,112,235, U.S. Pat. No. 3,135,648, U.S. Pat. No. 3,616,197, U.S. Pat. No. 3,697,369, U.S. Pat. No. 4,257,530, U.S. Pat. No. 4,016,327, U.S. Pat. No. 4,352,925, U.S. Pat. No. 5,037,700; U.S. Pat. No. 5,132,391, and U.S. Pat. No. 5,942,295. U.S. Pat. No. 4,130,234, discloses the use of hot melt adhesives in the lamination of polymeric films to paper cups. U.S. Pat. No. 4,722,474, discloses the use of adhesives for plastic laminated cardboard packaging articles. U.S. Pat. No. 4,900,594, discloses the formation of paperboard trays by pressure and heat forming of a flat polyester laminated paperboard stock adhered with a crosslinkable adhesives system. U.S. Pat. No. 5,110,390, discloses the lamination of coextruded bilayer films onto water soluble substrates by the use of adhesives. U.S. Pat. No. 5,679,201 and U.S. Pat. No. 6,071,577, disclose the use of adhesives to provide improved bond strengths between polyester coated paperboard onto polyethylene coated paperboard to produce, for example, juice containers.

The film can be coated with an adhesive, either by conventional coating technologies or by coextrusion, or the substrate may be coated with adhesives, or both the film and the substrate may be coated with adhesives.

Specific examples of adhesives that useful in lamination are provided hereinabove for use in affixing coatings made from the copolyesters onto substrates. Biodegradable adhesives are preferred, such as, for example; glue, gelatine, casein or starch, although any known adhesive can be used.

Laminated structures that include the sulfonated aliphatic-aromatic copolyesters have a wide variety of uses. For example, the laminates will find use as a component of personal sanitary items, such as disposable diapers, incontinence briefs, feminine pads, sanitary napkins, tampons, tampon applicators, motion sickness bags, baby pants, personal absorbent products, and the like. The laminates provide water barrier properties, to avoid leak through, with toughness to conform to the body and to stretch with the body movements during use. After their use, the soiled articles will biocompost when discarded appropriately. As further examples, the laminates are useful as protective films for use in agriculture, such as mulch films, seed coverings, agriculture mats containing seeds, ("seed tapes"), garbage and lawn waste bags, and the like. Further examples uses of the laminates include adhesive tape substrates, bags, bag closures, bed sheets, bottles, cartons, dust bags, fabric softener sheets, garment bags, industrial bags, trash bags, waste bin liners, compost bags, labels, tags, pillow cases, bed liners, bedpan liners, bandages, boxes, handkerchiefs, pouches, wipes, protective clothing, surgical gowns, surgical sheets, surgical sponges, temporary enclosures, temporary siding, toys, wipes, and the like.

A particularly preferred use of the laminates comprising the sulfonated aliphatic-aromatic copolyesters is in food packaging, especially for fast food packaging. Specific examples of food packaging uses, including wraps, are disclosed hereinabove with regard to uses of films containing the copolyesters.

The sulfonated aliphatic-aromatic copolyesters can also be made into sheets. Polymeric sheets have a variety of uses, such as in signage, glazings, thermoforming articles, displays and display substrates, for example. The copolyesters have melting points, glass transition temperatures, and degree of crystallinity that are advantageous for applications in which heat resistance, clarity, UV resistance, scratch resistance, tensile strength and/or impact resistance are desired, particularly for use at relatively low temperatures. The sulfonated aliphatic-aromatic copolyesters may be formed by one of the above methods, or by any other method, may be formed into sheets directly from the polymerization melt. In the alternative, the copolyester may be formed into an easily handled shape (such as, pellets) from the melt, which may then be used to form a sheet The sheet can be used for forming signs, glazings (such as in bus stop shelters, sky lights or recreational vehicles), displays, automobile lights and in thermoforming articles, for example.

Sheets can be made from the copolyesters by any known process. The difference between a sheet and a film is the thickness, but there is no set industry standard as to when a film becomes a sheet. As used herein, the term "sheet" means a structure having a thickness greater than about 0.25 mm (10 mils) thick, preferably between about 0.25 mm and 25 mm, more preferably from about 2 mm to about 15 mm, and even more preferably from about 3 mm to about 10 mm. In a preferred embodiment, the sheets have a thickness sufficient to provide rigidity, which generally occurs at about 0.50 mm and greater; however, sheets greater than 25 mm and thinner than 0.25 mm can be formed.

Sheets can be formed by any known process, such as extrusion, solution casting or injection molding. Preferred parameters for each of these processes can be determined by one of ordinary skill in the art depending upon viscosity characteristics of the sulfonated aliphatic-aromatic copolyester and the desired thickness of the sheet.

A sheet is preferably formed by either solution casting or extrusion. Extrusion is particularly preferred for formation of "endless" films and sheets, which emerge as a continuous length. Published patent applications WO 96/38282 and WO 97/00284 describe the formation of crystallizable sheets by melt extrusion. In extrusion, the polymeric material, whether provided as a molten polymer or as plastic pellets or granules, is fluidized and homogenized. The polymeric material is then forced through a suitably shaped die to produce the desired cross-sectional sheet shape. The extruding force may be exerted by a piston or ram (ram extrusion), or by a rotating screw (screw extrusion) as described herinabove. Using extrusion, a sheet can be produced by extruding a thin layer of polymer over chilled rolls and then further drawing down the sheet to size (>0.25 mm) by tension rolls. Preferably, the finished sheet is greater than 0.25 mm thick.

For manufacturing large quantities of sheets, a sheeting calender is employed. A rough, pre-formed sheet is fed into the gap of the calendar. The last roller smoothes the sheet thus produced. If the sheet is required to have a textured surface, the final roller is provided with an appropriate embossing pattern. Alternatively, the sheet can be reheated and then passed through an embossing calender. The calender is followed by one or more cooling drums. Finally, the finished sheet is reeled up. The extrusion process can be combined with a variety of post-extruding operations for expanded versatility. Such post-forming operations include altering round to oval shapes, stretching the sheet to different dimensions, machining and punching, biaxial stretching and the like, as known to those skilled in the art.

The copolyester can be combined with other polymeric materials during extrusion and/or finishing to form laminates or multilayer sheets with desired characteristics, such as water vapor resistance. A multilayer or laminate sheet can be made by any method, and can have as many as five or more separate layers joined together by heat, adhesive and/or tie layer.

A sheet can also be made by solution casting, which produces more consistently uniform gauge sheet than that made by melt extrusion. Solution casting comprises dissolving polymeric granules, powder or the like in a suitable solvent with any desired formulant, such as a plasticizer or colorant. The solution is filtered to remove dirt or large particles and cast from a slot die onto a moving belt, preferably of stainless steel, dried, whereon the sheet cools. The extrudate thickness is five to ten times that of the finished sheet. The sheet can then be finished in a like manner to an extruded sheet. Further, sheets and sheet-like articles, such as discs, can be formed by injection molding using any known method. One of ordinary skill in the art can determine appropriate process parameters based on the polymeric composition and process used for sheet formation.

Regardless of how the sheet is formed, it can be subjected to biaxial orientation by stretching in both the machine and transverse direction after formation, as disclosed hereinabove. Biaxially stretched sheets are preferred for certain uses where uniform sheeting is desired. Shrinkage can be controlled by holding the sheet in a stretched position and heating for a few seconds before quenching. This heat stabilizes the oriented sheet, which then can be forced to shrink only at temperatures above the heat stabilization-temperature. Process conditions and parameters for sheet making by any method in the art are easily determined by a skilled artisan for any given polymeric composition and desired application.

The properties exhibited by a sheet depend on several factors already described hereinabove, including the polymeric composition, the method of forming the polymer, the method of forming the sheet, and whether the sheet was treated for,stretch or biaxially oriented. These factors affect many properties of the sheet, such as shrinkage, tensile strength, elongation at break, impact strength, dielectric strength and constant, tensile modulus, chemical resistance, melting point, heat deflection temperature, and the like.

The sheet properties may be further adjusted by adding certain additives and fillers to the polymeric composition, such as colorants, dyes, UV and thermal stabilizers, antioxidants, plasticizers, lubricants antiblock agents, slip agents, and the like, as recited above. Alternatively, the sulfonated aliphatic-aromatic copolyesters can be blended with one or more other polymers, such as starch, to improve certain characteristics. Other polymers can be added to change such characteristics as air permeability, optical clarity, strength and/or elasticity, for example.

The sheets as described above can be thermoformed by any known method into any desirable shape, such as covers, skylights, shaped greenhouse glazings, displays, food trays, and the like. The thermoforming is accomplished by heating the sheet to a sufficient temperature and for sufficient time to soften the copolyester so that the sheet can be easily molded into the desired shape. One of ordinary skill in the art can determine the optimal thermoforming parameters depending upon the viscosity and crystallization characteristics of the polyester sheet.

The sulfonated aliphatic-aromatic copolyesters are useful in forming plastic containers. Plastic containers are widely used for foods and beverages, and also for non-food materials. Poly(ethylene terephthalate) (PET) is used to make many of these containers because of its appearance (optical clarity), ease of blow molding, chemical and thermal stability, and its price. PET is generally fabricated into bottles by blow molding processes, and generally by stretch blow molding. Containers can be made by any method, such as extrusion, injection molding, injection blow molding, rotational molding, thermoforming of a sheet, and stretch-blow molding.

Stretch-blow molding, a technique used in the production of poly(ethylene terephthalate) (PET) containers, such as bottles can be used in forming containers from the copolyesters. Use may be made of any of the cold parison methods, in which a preformed parison (generally made by injection molding) is taken out of the mold and then subjected to stretch blow molding in a separate step. The "hot parison" method can also be used, wherein the hot parison is immediately subjected to stretch blow molding in the same equipment without complete cooling after injection molding to make the parison. The parison temperature varies based on the exact composition of the polymer to be used. Generally, parison temperatures in the range from about 90 C to about 160 C are found useful. The stretch blow molding temperature also varies dependent on the exact material composition used, but a mold temperature of about 80 C to about 150 C is generally found to be useful.

Exemplary containers that can be made from the copolyesters include narrow-mouth bottles and wide-mouth bottles having threaded tops and a volume of about 400 mL to about 3 liters, although smaller and larger containers may be formed. The containers can be used in standard cold fill applications. Some compositions containing the copolyesters can be used to make containers for use in hot fill applications. The containers are suitable for foods and beverages, and other solids and liquids. The containers are normally clear and transparent, but can be modified to have color or to be opaque, rather than transparent, if desired, by adding colorants or dyes, or by causing crystallization of the polymer, which results in opaqueness.

The sulfonated aliphatic-aromatic copolyesters can also be formed into fibers. The term "fibers" as used herein includes continuous monofilaments, non-twisted or entangled multifilament yarns, staple yarns, spun yarns, and non-woven materials. Synthetic fibers are made by spinning and drawing the polymer into a filament, which is then formed into a yarn by winding many filaments together. Polyester fibers are produced in large quantities for use in a variety of applications, and are desirable for use in textiles, particularly in combination with natural fibers such as cotton and wool. Clothing, rugs, and other items can be fashioned from polyester fibers. Further, polyester fibers are desirable for use in industrial applications due to their elasticity and strength. Such fibers can be used to form uneven fabrics, knitted fabrics, fabric webs, or any other fiber-containing structures, such as tire cords and ropes. The fibers can be treated mechanically and/or chemically to impart desirable characteristics such as strength, elasticity, heat resistance, hand (feel of fabric), and the like depending on the desired end product to be fashioned from the fibers.

The monomer composition of the sulfonated aliphatic-aromatic copolyester is desirably chosen to result in a partially crystalline polymer. The crystallinity is desirable for the formation of fibers, providing strength and elasticity. As first produced, the polyester is mostly amorphous in structure. In preferred embodiments, the polyester polymer readily crystallizes on reheating and/or extension of the polymer. Fibers can be made from the polymer by any process. Generally, however, melt spinning is preferred for polyester fibers.

Melt spinning comprises heating the polymer to form a molten liquid, or melting the polymer against a heated surface. The molten polymer is forced through a spinneret with a plurality of fine holes. Upon contact with air or a non-reactive gas stream after passing through the spinneret, the polymer from each spinneret solidifies into filaments. The filaments are gathered together downstream from the spinneret by a convergence guide, and can be taken up by a roller or a plurality of rollers. This process allows filaments of various sizes and cross sections to be formed, including filaments having a round, elliptical, square, rectangular, lobed or dog-boned cross section, for example.

Following the extrusion and uptake of the fiber, the fiber can be drawn, thereby increasing the crystallization and maximizing desirable properties such as orientation along the longitudinal axis, which increases elasticity, and strength. The drawing can be done in combination with take-up by using a series of rollers, some of which are generally heated, or can be done as a separate stage in the process of fiber formation.

The polymer can be spun at speeds of from about 600 to 6000 meters per minute or higher, depending on the desired fiber size.

For textile applications, a fiber with a denier per filament of from about 0.1 to about 100 is desired. Preferably, the denier is about 0.5 to 20, more preferably 0.7 to 10. However, for industrial applications the fiber can have from about 0.5 to 100 denier per filament, preferably about 1.0 to 10.0, more preferably 3.0 to 5.0 denier per filament. The required size and strength of a fiber can be readily determined by one of ordinary skill in the art for any given application.

Material made from the fibers can be processed using additional processing equipment, or used directly in applications requiring a continuous filament textile yarn. If desired, the filamentary material subsequently can be converted from a flat yarn to a textured yarn by known false twist texturing conditions or other processes. For some applications, such as textiles, it is desirable to increase the surface area of the fiber to provide a softer feel and to enhance the ability of the fibers to breathe, thereby providing better insulation and water retention. The fibers can be crimped or twisted by the false twist method, air jet, edge crimp, gear crimp, or stuffer box, for example. Alternatively, the fibers can be cut into shorter lengths, called staple, which can be processed into yarn. A skilled artisan can determine a suitable method of crimping or twisting based on the desired application and the composition of the fiber.

After formation, the fibers can be finished by any method appropriate to the desired final use. For textile applications, finishing can include dyeing, sizing, and/or addition of chemical agents such as antistatic agents, flame retardants, UV light stabilizers, antioxidants, pigments, dyes, stain resistants, antimicrobial agents and the like, as appropriate to adjust the look and hand of the fibers. For industrial applications, the fibers can be treated to impart additional desired characteristics such as, for example, strength, elasticity or shrinkage.

A continuous filament fiber can be used as produced or texturized for use in a variety of applications such as textile fabrics for apparel and home furnishings. High tenacity fiber can be used in industrial applications such as high strength fabrics, tarpaulins, sailcloth, sewing threads and rubber reinforcement for tires and V-belts, for example.

A staple fiber can be used to form a blend with natural fibers, especially cotton and wool. Blending may be desirable since polyester fiber is chemically resistant fiber and is generally resistant to mold, mildew, and other problems inherent to natural fibers. The polyester fiber further adds strength and abrasion resistance to other fibers, and blending can also result in lower cost. Polyester fiber is therefore desirable for use in textiles and other commercial applications, such as for use in fabrics for apparel, home furnishings and carpets.

Further, the sulfonated aliphatic-aromatic copolyester polymer can be used with one or more synthetic or natural polymers to form heterogeneous fiber or bicomponent fiber, thereby providing a fiber having particular desired properties. A heterogeneous fiber can be formed using known methods, and in designs such as, for example, side-by-side, sheath-core, and matrix.

The sulfonated aliphatic-aromatic copolyesters can be formed into shaped foamed articles. Thermoplastic polymeric materials are foamed to provide low density articles, such as films, cups, food trays, decorative ribbons, furniture parts and the like. Foaming is a known method to decrease the weight of molded parts, films, sheets, food trays, thermoformed parts and the like. Such foamed articles also provide improved insulating properties as compared to unfoamed articles.

Polyester to be foamed preferably has a sufficiently high melt viscosity to hold a foamed shape sufficiently long for the polyester to solidify to form the final foamed article. The inherent viscosity of the polyester can be increased, for example, by post-polymerization processes, such as the solid state polymerization method, as described hereinabove. Alternatively, the polyester can contain a branching agent, as described in U.S. Pat. No. 4,132,707, U.S. Pat. No. 4,145,466, U.S. Pat. No. 4,999,388, U.S. Pat. No. 5,000,991, U.S. Pat. No. 5,110,844, U.S. Pat. No. 5,128,383, and U.S. Pat. No. 5,134,028. Such branched polyesters can additionally be subjected to solid state polymerization, as described above, to further enhance the melt viscosity. The material can further incorporate a chain extension agent, such as a dianhydride or a polyepoxide, which are typically added during the foaming process.

The polyesters can be readily foamed by a wide variety of methods. Exemplary foaming methods include the injection of an inert gas such as nitrogen or carbon dioxide into the melt during extrusion or molding operations. Alternatively, inert hydrocarbon gases such as methane, ethane, propane, butane, and pentane, or chlorofluorocarbons, hydrochlorofluorocarbons, hydrofluorocarbons, and the like can be used. Another method includes the dry blending of chemical blowing agents with the polyester and then extruding or molding the compositions to provide foamed articles. During extrusion or molding, an inert gas such as nitrogen is released by the blowing agents and provides foaming. Typical blowing agents include azodicarbonamide, hydrazocarbonamide, dinitrosopentamethylenetetramine, p-toluenesulfonyl hydrazodicarboxylate, 5-phenyl-3,6-dihydro-1,3,4-oxa-diazin-2-one, sodium borohydride, sodium bicarbonate, 5-phenyltetrazole, p,p'-oxybis (benzenesulfonylhydrazide) and the like. Still another method includes the blending of sodium carbonate or sodium bicarbonate with one portion of the polyester pellets, blending of an organic acid, such as citric acid, with another portion of the polyester pellets and then blending of the two portions of pellets by extrusion or molding at elevated temperatures. Carbon dioxide gas is released during the interaction of the sodium carbonate and citric acid to provide the desired foaming of the polymeric melt.

In some embodiments, the foamable polyester compositions incorporate nucleation agents to create sites for bubble initiation, control the cell size of the foamed sheet or object and/or hasten the solidification of the as foamed article. Examples of nucleation agents include sodium acetate, talc, titanium dioxide, polyolefin materials such as polyethylene, polypropylene.

Polymeric foaming equipment and processes are known and are disclosed in, for example, U.S. Pat. No. 6,116,881, U.S. Pat. No. 5,134,028, U.S. Pat. No. 4,626,183, U.S. Pat. No. 5,128,383, U.S. Pat. No. 4,746,478, U.S. Pat. No. 5,110,844, U.S. Pat. No. 5,000,844, and U.S. Pat. No. 4,761,256. Reviews of foaming technology can be found in Kirk-Othmer Encyclopedia of Chemical Technology, Third Edition, Volume 11, pp. 82–145 (1980), John Wiley and Sons, Inc., New York, N.Y. and the Encyclopedia of Polymer Science and Engineering, Second Edition, Volume 2, pp. 434–446 (1985), John Wiley and Sons, Inc., New York, N.Y.

As described above, the foamable polyester compositions can include a wide variety of additives, fillers, or be blended with other materials. For biodegradable foams, the addition of cellulose, cellulose derivatives, such as chemically modified cellulose, starch, and starch derivatives, such as chemically modified starch and thermoplastic starch, is especially preferred.

EXAMPLES

Test Methods.

Unless otherwise stated, the following test methods were used in the following examples and comparative examples Differential Scanning Calorimetry, (DSC), is performed on a TA Instruments Model Number 2926 machine. Samples are heated under a nitrogen atmosphere at a rate of 20° C./minute to 300° C., programmed cooled back to room temperature at a rate of 20° C./minute and then reheated to 300° C. at a rate of 20° C./minute. The observed sample glass transition temperature, (Tg), and crystalline melting temperature, (Tm), noted below were from the second heat.

Inherent Viscosity, (IV), is defined in "Preparative Methods of Polymer Chemistry", W. R. Sorenson and T. W. Campbell, 1961, p. 35. It is determined at a concentration of 0.5 g./100 mL of a 50:50 weight percent trifluoroacetic acid:dichloromethane acid solvent system at room temperature by a Goodyear R-103B method.

Laboratory. Relative Viscosity, (LRV), is the ratio of the viscosity of a solution of 0.6 gram of the polyester sample dissolved in 10 mL of hexafluoroisopropanol, (HFIP), containing 80 ppm sulfuric acid to the viscosity of the sulfuric acid-containing hexafluoroisopropanol itself, both measured at 25° C. in a capillary viscometer. The LRV may be numerically related to IV. Where this relationship is utilized, the term "calculated IV" is noted.

Biodegradation was performed according to the ISO 14855 method: "Determination of the ultimate aerobic biodegradability and disintegration of plastic materials under controlled composting conditions—Method by analysis of evolved carbon". This test involved injecting an inoculum consisting of a stabilized and mature compost derived from the organic fraction of municipal solid waste with ground powder of the polymer to be tested on a vermiculite matrix, composting under standard conditions at an incubation temperature controlled at 58 C+/−2 C. The test was conducted with one polymer sample. The carbon dioxide evolved is used to determine the extent of biodegradation.

Prior to testing film properties, the film samples were conditioned for 40 hours at 72 F and 50 percent humidity. Elmendorf Tear was determined as per ASTM 1922. Graves Tear was determined as per ASTM D1004. Tensile Strength at break, tensile modulus and percent elongation at break was determined as per ASTM D882.

Comparative Example CE 1

To a 250 milliliter glass flask was added bis(2-hydroxyethyl)terephthalate, (80.09 grams), ethylene glycol, (10.55 grams), dimethyl isophthalate-3-sodium sulfonate, (10.37 grams), dimethyl glutarate, (24.03 grams), manganese(II) acetate tetrahydrate, (0.042 grams), and antimony(III) trioxide, (0.034 grams). The reaction mixture was stirred and heated to 180 C under a slow nitrogen purge. After achieving 180 C, the reaction mixture was heated to 275 C over 3.6 hours with stirring under a slow nitrogen purge. The resulting reaction mixture was stirred at 275 C under a slight nitrogen purge for 1 hour. 16.2 grams of a colorless distillate was collected over this heating cycle. The reaction mixture was then staged to full vacuum with stirring at 275 C. The resulting reaction mixture was stirred for 3.4 hours under full vacuum, (pressure less than 100 mtorr). The vacuum was then released with nitrogen and the reaction mass allowed to cool to room temperature. An additional 1.7 grams of distillate was recovered and 82.8 grams of a solid product was recovered.

The sample was measured for inherent viscosity, (IV), as described above and was found to have an IV of 0.50 dL/g.

The sample underwent differential scanning calorimetry, (DSC), analysis. No thermal transitions were discernable between room temperature and 300 C.

Comparative Example CE 2

To a 250 milliliter glass flask was added bis(2-hydroxyethyl)terephthalate, (86.44 grams), ethylene glycol, (7.45 grams), dimethyl isophthalate-3-sodium sulfonate, (2.96 grams), dimethyl glutarate, (24.03 grams), manganese (II) acetate tetrahydrate, (0.042 grams), and antimony(III) trioxide, (0.034 grams). The reaction mixture was stirred and heated to 180 C under a slow nitrogen purge. After achieving 180 C, the reaction mixture was heated to 275 C over 3.5 hours with stirring under a slow nitrogen purge. The resulting reaction mixture was stirred at 275° C. under a slight nitrogen purge for 1 hour. 11.6 grams of a colorless distillate was collected over this heating cycle. The reaction mixture was then staged to full vacuum with stirring at 275° C. The resulting reaction mixture was stirred for 2.3 hours under full vacuum, (pressure less than 100 mtorr). The vacuum was then released with nitrogen and the reaction mass allowed to cool to room temperature. An additional 7.3 grams of distillate was recovered and 71.7 grams of a solid product was recovered.

The sample was measured for inherent viscosity, (IV), as described above and was found to have an IV of 0.78 dL/g.

The sample underwent differential scanning calorimetry, (DSC), analysis. A glass transition temperature, (Tg), was found with an onset temperature of 32.5° C., a midpoint temperature of 34.6° C., and an endpoint temperature of 36.5° C. No crystalline melting temperature, (Tm), was observed between room temperature and 300° C.

Comparative Example CE 3

To a 250 milliliter glass flask was added bis(2-hydroxyethyl)terephthalate, (86.95 grams), ethylene glycol, (7.45 grams), dimethyl isophthalate-3-sodium sulfonate, (2.37 grams), dimethyl glutarate, (24.03 grams), manganese (II) acetate tetrahydrate, (0.042 grams), and antimony(III) trioxide, (0.034 grams). The reaction mixture was stirred and heated to 180° C. under a slow nitrogen purge. After achieving 180° C., the reaction mixture was heated to 275° C. over 3.5 hours with stirring under a slow nitrogen purge. The resulting reaction mixture was stirred at 275° C. under a slight nitrogen purge for 1 hour. 12.6 grams of a colorless distillate was collected over this heating cycle. The reaction mixture was then staged to full vacuum with stirring at 275° C. The resulting reaction mixture was stirred for 2.1 hours under full vacuum, (pressure less than 100 mtorr). The vacuum was then released with nitrogen and the reaction mass allowed to cool to room temperature. An additional 8.4 grams of distillate was recovered and 68.9 grams of a solid product was recovered.

The sample was measured for inherent viscosity, (IV), as described above and was found to have an IV of 0.79 dL/g.

The sample underwent differential scanning calorimetry, (DSC), analysis. A glass transition temperature, (Tg), was found with an onset temperature of 32.3° C., a midpoint temperature of 34.6° C., and an endpoint temperature of 36.9° C. No crystalline melting temperature, (Tm), was observed between room temperature and 300° C.

Example 1

To a 250 milliliter glass flask was added bis(2-hydroxyethyl)terephthalate, (88.35 grams), ethylene glycol, (6.52 grams), dimethyl isophthalate-3-sodium sulfonate, (0.74 grams), dimethyl glutarate, (24.03 grams), manganese (II) acetate tetrahydrate, (0.042 grams), and antimony(III) trioxide, (0.034 grams). The reaction mixture was stirred and heated to 180° C. under a slow nitrogen purge. After achieving 180° C., the reaction mixture was heated to 275° C. over 3.5 hours with stirring under a slow nitrogen purge. The resulting reaction mixture was stirred at 275° C. under a slight nitrogen purge for 1 hour. 8.5 grams of a colorless distillate was collected over this heating cycle. The reaction mixture was then staged to full vacuum with stirring at 275° C. The resulting reaction mixture was stirred for 2.2 hours under full vacuum, (pressure less than 100 mtorr). The vacuum was then released with nitrogen and the reaction mass allowed to cool to room temperature. An additional 12.3 grams of distillate was recovered and 68.8 grams of a solid product was recovered.

The sample was measured for laboratory relative viscosity, (LRV), as described above and was found to have an LRV of 32.3. This sample was calculated to have an inherent viscosity of 0.83 dL/g.

The sample underwent differential scanning calorimetry, (DSC), analysis. A glass transition temperature, (Tg), was found with an onset temperature of 33.6° C., a midpoint temperature of 35.0° C., and an endpoint temperature of 36.1° C. A broad crystalline melting temperature, (Tm), was observed at 181.8° C., (3.9 J/g).

Example 2

To a 250 milliliter glass flask was added bis(2-hydroxyethyl)terephthalate, (88.86 grams), ethylene glycol, (6.27 grams), dimethyl isophthalate-3-sodium sulfonate, (0.15 grams), dimethyl glutarate, (24.03 grams), manganese (II) acetate tetrahydrate, (0.042 grams), and antimony(III) trioxide, (0.034 grams). The reaction mixture was stirred and heated to 180° C. under a slow nitrogen purge. After achieving 180° C., the reaction mixture was heated to 275° C. over 3.6 hours with stirring under a slow nitrogen purge. The resulting reaction mixture was stirred at 275° C. under a slight nitrogen purge for 1 hour. 12.8 grams of a colorless distillate was collected over this heating cycle. The reaction mixture was then staged to full vacuum with stirring at 275° C. The resulting reaction mixture was stirred for 2.4 hours under full vacuum, (pressure less than 100 mtorr). The vacuum was then released with nitrogen and the reaction mass allowed to cool to room temperature. An additional 7.0 grams of distillate was recovered and 64.0 grams of a solid product was recovered.

The sample was measured for laboratory relative viscosity, (LRV), as described above and was found to have an LRV of 32.7. This sample was calculated to have an inherent viscosity of 0.84 dL/g.

The sample underwent differential scanning calorimetry, (DSC), analysis. A glass transition temperature, (Tg), was found with an onset temperature of 35.8° C., a midpoint temperature of 37.6° C., and an endpoint temperature of 39.5° C. A broad crystalline melting temperature, (Tm), was observed at 185.1° C., (16.8 J/g). Comparative examples 1 through 3 and Examples 1 and 2 illustrate the semicrystallinity of the copolyesters disclosed herein, in contrast with the higher-sulfonated compositions of the comparative examples.

Comparative Example CE 4

To a 250 milliliter glass flask was added bis(2-hydroxyethyl)terephthalate, (105.51 grams), dimethyl isophthalate-3-sodium sulfonate, (2.96 grams), dimethyl glutarate, (12.01 grams), manganese(II) acetate tetrahydrate, (0.042 grams), and antimony(III) trioxide, (0.034 grams). The reaction mixture was stirred and heated to 180° C. under a slow nitrogen purge. After achieving 180°0 C., the reaction mixture was heated to 275° C. over 3.6 hours with stirring under a slow nitrogen purge. The resulting reaction mixture was stirred at 275° C. under a slight nitrogen purge for 1 hour. 13.1 grams of a colorless distillate was collected over this heating cycle. The reaction mixture was then staged to full vacuum with stirring at 275° C. The resulting reaction mixture was stirred for 1.8 hours under full vacuum, (pressure less than 100 mtorr). The vacuum was then released with nitrogen and the reaction mass allowed to cool to room temperature. An additional 3.2 grams of distillate was recovered and 61.7 grams of a solid product was recovered.

The sample was measured for inherent viscosity, (IV), as described above and was found to have an IV of 0.61 dL/g.

The sample underwent differential scanning calorimetry, (DSC), analysis. A glass transition temperature, (Tg), was found with an onset temperature of 51.6° C., a midpoint temperature of 53.6° C., and an endpoint temperature of 55.5° C. A crystalline melting temperature, (Tm), was observed at 210.8° C., (26.5 J/g).

Example 3

To a 1 liter glass flask was added bis(2-hydroxyethyl)terephthalate, (647.55 grams), dimethyl isophthalate-3-sodium sulfonate, (0.89 grams), dimethyl glutarate, (72.08 grams), manganese(II) acetate tetrahydrate, (0.25 grams), and antimony(III) trioxide, (0.20 grams). The reaction mixture was stirred and heated to 180° C. under a slow nitrogen purge. After achieving 180° C., the reaction mixture was heated to 275° C. over 1.7 hours with stirring under a slow nitrogen purge. The resulting reaction mixture was stirred at 275° C. under a slight nitrogen purge for 1.0 hour. 87.5 grams of a colorless distillate was collected over this heating cycle. The reaction mixture was then staged to full vacuum with stirring at 275° C. The resulting reaction mixture was stirred for 4.4 hours under full vacuum, (pressure less than 100 mtorr). The vacuum was then released with nitrogen and the reaction mass allowed to cool to room temperature. An additional 75.4 grams of distillate was recovered and 444.1 grams of a solid product was recovered.

The sample was measured for inherent viscosity, (IV), as described above and was found to have an IV of 0.61 dL/g.

The sample underwent differential scanning calorimetry, (DSC), analysis. A glass transition temperature, (Tg), was found with an onset temperature of 49.7° C., a midpoint temperature of 54.3° C., and an endpoint temperature of 58.5° C. A broad crystalline melting temperature, (Tm), was observed at 228.7° C., (28.3 J/g).

Example 4

To a 1 liter glass flask was added bis(2-hydroxyethyl)terephthalate, (617.12 grams), dimethyl isophthalate-3-sodium sulfonate, (0.80 grams), dimethyl glutarate, (43.25 grams), manganese(II) acetate tetrahydrate, (0.23 grams), and antimony(III) trioxide, (0.18 grams). The reaction mixture was stirred and heated to 180° C. under a slow nitrogen purge. After achieving 180° C., the reaction mixture was heated to 275° C. over 2.4 hours with stirring under a slow nitrogen purge. The resulting reaction mixture was stirred at 275° C. under a slight nitrogen purge for 1.3 hours. 85.8 grams of a colorless distillate was collected over this heating cycle. The reaction mixture was then staged to full vacuum with stirring at 275° C. The resulting reaction mixture was stirred for 3.8 hours under full vacuum, (pressure less than 100 mtorr). The vacuum was then released with nitrogen and the reaction mass allowed to cool to room temperature. An additional 68.7 grams of distillate was recovered and 376.0 grams of a solid product was recovered.

The sample was measured for inherent viscosity, (IV), as described above and was found to have an IV of 0.63 dL/g.

The sample underwent differential scanning calorimetry, (DSC), analysis. A glass transition temperature, (Tg), was found with an onset temperature of 61.9° C., a midpoint temperature of 68.3° C., and an endpoint temperature of 72.7° C. A broad crystalline melting temperature, (Tm), was observed at 237.8° C., (32.2 J/g).

Example 5

To a 1 liter glass flask was added bis(2-hydroxyethyl) terephthalate, (411.18 grams), dimethyl isophthalate, (131.08 grams), ethylene glycol, (67.10 grams), dimethyl isophthalate-3-sodium sulfonate, (0.80 grams), dimethyl glutarate, (64.87 grams), manganese(II) acetate tetrahydrate, (0.23 grams), and antimony(III) trioxide, (0.18 grams). The reaction mixture was stirred and heated to 180° C. under a slow nitrogen purge. After achieving 180° C., the reaction mixture was heated to 275° C. over 2.5 hours with stirring under a slow nitrogen purge. The resulting reaction mixture was stirred at 275° C. under a slight nitrogen purge for 1.2 hours. 132.9 grams of a colorless distillate was collected over this heating cycle. The reaction mixture was then staged to full vacuum with stirring at 275° C. The resulting reaction mixture was stirred for 3.7 hours under full vacuum, (pressure less than 100 mtorr). The vacuum was then released with nitrogen and the reaction mass allowed to cool to room temperature. An additional 44.6 grams of distillate was recovered and 450.1 grams of a solid product was recovered.

The sample was measured for inherent viscosity, (IV), as described above and was found to have an IV of 0.32 dL/g.

The sample underwent differential scanning calorimetry, (DSC), analysis. A glass transition temperature, (Tg), was found with an onset temperature of 48.3° C. and an endpoint temperature of 53.6° C. No crystalline melting temperature, (Tm), was observed.

Example 6

To a 1 liter glass flask was added bis(2-hydroxyethyl) terephthalate, (445.51 grams), dimethyl isophthalate, (131.08 grams), ethylene glycol, (50.35 grams), dimethyl isophthalate-3-sodium sulfonate, (0.80 grams), dimethyl glutarate, (43.25 grams), manganese(II) acetate tetrahydrate, (0.23 grams), and antimony(III) trioxide, (0.18 grams). The reaction mixture was stirred and heated to 180° C. under a slow nitrogen purge. After achieving 180° C., the reaction mixture was heated to 275° C. over 2.2 hours with stirring under a slow nitrogen purge. The resulting reaction mixture was stirred at 275° C. under a slight nitrogen purge for 1.2 hours. 113.2 grams of a colorless distillate was collected over this heating cycle. The reaction mixture was then staged to full vacuum with stirring at 275° C. The resulting reaction mixture was stirred for 3.9 hours under full vacuum, (pressure less than 100 mtorr). The vacuum was then released with nitrogen and the reaction mass allowed to cool to room temperature. An additional 57.8 grams of distillate was recovered and 454.6 grams of a solid product was recovered.

The sample was measured for inherent viscosity, (IV), as described above and was found to have an IV of 0.41 dL/g.

The sample underwent differential scanning calorimetry, (DSC), analysis. A glass transition temperature, (Tg), was found with an onset temperature of 56.1° C. and an endpoint temperature of 61.1° C. No crystalline melting temperature, (Tm), was observed.

Example 7

To a 1 liter glass flask was added bis(2-hydroxyethyl) terephthalate, (514.15 grams), dimethyl isophthalate, (78.65 grams), ethylene glycol, (17.09 grams), dimethyl isophthalate-3-sodium sulfonate, (0.80 grams), dimethyl glutarate, (43.25 grams), manganese(II) acetate tetrahydrate, (0.23 grams), and antimony(III) trioxide, (0.18 grams). The reaction mixture was stirred and heated to 180° C. under a slow nitrogen purge. After achieving 180° C., the reaction mixture was heated to 275° C. over 2.0 hours with stirring under a slow nitrogen purge. The resulting reaction mixture was stirred at 275° C. under a slight nitrogen purge for 1.5 hours. 99.7 grams of a colorless distillate was collected over this heating cycle. The reaction mixture was then staged to full vacuum with stirring at 275° C. The resulting reaction mixture was stirred for 4.4 hours under full vacuum, (pressure less than 100 mtorr). The vacuum was then released with nitrogen and the reaction mass allowed to cool to room temperature. An additional 53.6 grams of distillate was recovered and 441.0 grams of a solid product was recovered.

The sample was measured for inherent viscosity, (IV), as described above and was found to have an IV of 0.50 dL/g.

The sample underwent differential scanning calorimetry, (DSC), analysis. A glass transition temperature, (Tg), was found with an onset temperature of 58.7° C. and endpoint temperature of 64.0° C. A broad crystalline melting temperature, (Tm), was observed at 194.1° C., (18.0 J/g).

Example 8

To a 250 milliliter glass flask was added bis(2-hydroxyethyl)terephthalate, (62.92 grams), ethylene glycol, (18.93 grams), dimethyl isophthalate-3-sodium sulfonate, (0.74 grams), dimethyl adipate, (43.55 grams), manganese (II) acetate tetrahydrate, (0.042 grams), and antimony(III) trioxide, (0.034 grams). The reaction mixture was stirred and heated to 180° C. under a slow nitrogen purge. After achieving 180° C., the reaction mixture was heated to 275° C. over 3.7 hours with stirring under a slow nitrogen purge. The resulting reaction mixture was stirred at 275° C. under a slight nitrogen purge for 1 hour. 6.7 grams of a colorless distillate was collected over this heating cycle. The reaction mixture was then staged to full vacuum with stirring at 275° C. The resulting reaction mixture was stirred for 3.5 hours under full vacuum, (pressure less than 100 mtorr). The vacuum was then released with nitrogen and the reaction mass allowed to cool to room temperature. An additional 15.8 grams of distillate was recovered and 70.5 grams of a solid product was recovered.

The sample was measured for inherent viscosity, (IV), as described above and was found to have an IV of 0.44 dL/g.

The sample underwent differential scanning calorimetry, (DSC), analysis. A broad crystalline melting temperature, (Tm), of 142.0° C., (6.3 J/g), was observed.

Example 9

A polymer prepared similarly to that described in Example 1, except at a larger scale, is dried in a hopper dryer for 8 hours at 80° C. to a −40° C. dew point. The material is then fed at a rate of 20 pounds per hour into the feed section of a 1½-inch diameter single screw Davis Standard extruder, (screw L/D of 24:1, model number DS-15H). The extruder conditions and temperature profile is noted below. The molten polymer is then fed into a Killion 3 roll stack sheet line with the conditions and temperature profile noted below.

Extruder Zone 1 temperature, (feed section): 340 F
Extruder Zone 2 temperature: 385 F
Extruder Zone 3 temperature: 385 F
Extruder Zone 4 (front) temperature: 365 F
Flange: 385 F
Pipe: 385 F
Flange: 385 F
Die temperature: 380 F
Die Lips: 380 F
Melt Temperature: 385 F
Extruder Amps: 3.4
Extruder RPM: 50
Chill Roll Top temperature: 70 F
Chill Roll Middle temperature: 70 F
Chill Roll Bottom temperature: 70 F
Film Take Off Speed: 275 inches/minute A film 8 inches wide with a thickness of 0.003 inches, (3 mils), is produced.

The film is tested as a fast food sandwich wrap packaging and found to have excellent deadfold performance.

Example 10

2 inch squares of the film produced above in Example 9 is preheated to 50° C. for 4 minutes, (being careful not to allow the hot air to impinge directly onto the film so as to avoid hot spots), and biaxially oriented on a tenter frame T. M. Long Biaxial stretcher. The draw ratio of the stretcher is set at 3 times 3 and the stretching rate is 5 inches per second (12.7 cm/second). The biaxially stretched film is found to have at least a 10 percent greater tensile strength in both the machine direction, (MD), and in the transverse direction, (TD), then found for the undrawn film.

The biaxially stretched film is tested as a fast food sandwich wrap packaging and found to have excellent deadfold performance.

Examples 11–16 and Comparative Examples CE 5 and CE 7

Polymers prepared similarly to as described above in the Examples listed below in Table 1, except at a larger scale, are dried in a hopper dryer for 8 hours at 60° C. to a −40° C. dew point. The materials are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with the heater profile noted within Table 1.

TABLE 1

| Example | Polymer Example | Extruder Heater Profile | | | | | | |
|---|---|---|---|---|---|---|---|---|
| | | Zone 1 (C) | Zone 2 (C) | Zone 3 (C) | Zone 4 (C) | Zone 5 (C) | Die (C) | Melt (C) |
| CE5 | CE1 | 130 | 160 | 160 | 160 | 165 | 170 | 175 |
| CE6 | CE2 | 140 | 170 | 170 | 170 | 175 | 180 | 185 |
| CE7 | CE3 | 145 | 175 | 175 | 175 | 180 | 185 | 185 |
| 11 | 1 | 170 | 200 | 200 | 200 | 200 | 205 | 200 |
| 12 | 2 | 175 | 205 | 205 | 205 | 205 | 210 | 205 |
| 13 | 3 | 220 | 250 | 250 | 250 | 250 | 255 | 250 |
| 14 | 4 | 230 | 260 | 260 | 260 | 260 | 265 | 260 |
| 15 | 7 | 180 | 215 | 215 | 215 | 215 | 220 | 215 |
| 16 | 8 | 130 | 160 | 160 | 160 | 160 | 165 | 160 |

The extruded polymer films are electrostatically pinned on an 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils.

Comparative Examples CE 5, CE 6 and CE 7 are found to have a low yield of film due to extensive blocking.

The films of Examples 11 to 16 are tested as fast food sandwich wraps and are found to have excellent deadfold performance.

The films of Examples 11 to 16 are tested for physical properties and found to have an excellent combination of toughness, as measured by Elmendorf Tear, Graves Tear, and percent elongation at break, and strength, as measured by tensile strength at break and tensile modulus.

10 Inch by 16 inch rectangles are cut out of the film of Example 11, Example 12, Comparative Example CE 5, Comparative Example CE 6, and Comparative Example CE 7 and the size accurately measured. The film rectangles are placed in a Fisher Scientific Isotemp Incubator, Model Number 625D, heated to 60° C. for 1 hour. The film rectangles are then accurately remeasured. It is found that Example 11 and Example 12 have at least 10 percent less shrinkage than is found for Comparative Example CE 5, Comparative Example CE 6 and Comparative Example CE 7.

Examples 17–22 and Comparative Examples CE 8–CE 10

The films produced in the Examples listed below in Table 2, with a thickness of between about 1.5 mils to 8 mils, are sent through a Machine Direction Orienter (MDO) Model Number 7200 from the Marshall and Williams Company of Providence, R.I. The MDO unit is preheated to the temperature listed in Table 2, below, and the film is stretched as noted below in Table 2 while at that temperature. For example, "Stretched 3X" means that, for example, a 1 meter long film would be stretched to a resultant length of 3 meters.

TABLE 2

| Example | Cast Film Example | MDO Temperature (C.) | MDO Stretch |
|---|---|---|---|
| CE 8 | CE 5 | 50 | 3X |
| CE 9 | CE 6 | 50 | 3X |
| CE 10 | CE 7 | 60 | 3X |

TABLE 2-continued

| Example | Cast Film Example | MDO Temperature (C.) | MDO Stretch |
|---|---|---|---|
| 17 | 11 | 60 | 3X |
| 18 | 12 | 60 | 3X |
| 19 | 13 | 70 | 3X |
| 20 | 14 | 70 | 3.5X |
| 21 | 15 | 60 | 4X |
| 22 | 16 | 40 | 4X |

The production of Comparative Examples CE 8, CE 9, and CE 10 are found to be difficult due to sticking to the equipment during processing and film blocking. In contrast, Examples 17 and 18 are produced without difficulty due to their higher level of crystallinity and greater crystallization rate.

The uniaxially stretched films of Examples 17 to 22 are found to have at least a 10 percent greater tensile strength in the machine direction, (MD), than found for the corresponding undrawn films.

The uniaxially stretched films of Examples 17 to 22 are tested as a fast food sandwich wrap packaging and found to have excellent deadfold performance.

Examples 23–28

2 inch squares of the films produced above and detailed in Table 3 below are preheated to the temperature noted below in Table 3 for 4 minutes, (being careful not to allow the hot air to impinge directly onto the film so as to avoid hot spots), and biaxially oriented on a tenter frame T. M. Long Biaxial stretcher. The draw ratio of the stretcher is set at 3 times 3 and the stretching rate is 5 inches per second (12.7 cm/second).

TABLE 3

| Example | Cast Film Example | Biaxial Stretch Temperature (C.) |
|---|---|---|
| 23 | 11 | 60 |
| 24 | 12 | 60 |
| 25 | 13 | 70 |
| 26 | 14 | 70 |
| 27 | 15 | 60 |
| 28 | 16 | 40 |

The biaxially stretched films are found to have at least a 10 percent greater tensile strength in both the machine direction, (MD), and in the transverse direction, (TD), then found for the undrawn film.

The biaxially stretched films are tested as a fast food sandwich wrap packaging and found to have excellent deadfold performance.

Examples 29–33

A polymer prepared similarly to as described in Example 2, except at a larger scale, is dried in a hopper dryer for 8 hours at 60° C. to a −40° C. dew point. The material is powder blended with 0.10 weight percent, (based on polymer weight), Irganox-1010, a hindered phenolic anitoxidant from the Ciba Company. The material is placed in the hopper of a single screw volumetric feeder, (K-tron Model No. 7), from which it free falls to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile of

| Zone 1 (C) | Zone 2 (C) | Zone 3 (C) | Zone 4 (C) | Zone 5 (C) | Die (C) |
|---|---|---|---|---|---|
| 175 | 200 | 205 | 205 | 205 | 210 |

A plasticizer, acetyl tri-n-butyl citrate, from Morflex, Inc., is injected into zone 2 at a rate to provide the compositions listed below in Table 4 with an Accurate feeder. The plasticizer level shown in Table 4 is based on the weight of the total composition.

TABLE 4

| Example | Plasticizer Level (wt. %) |
|---|---|
| 29 | 0 |
| 30 | 5 |
| 31 | 10 |
| 32 | 15 |
| 33 | 20 |

The extruded polymer film is electrostatically pinned on an 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils.

The films are tested as fast food sandwich wrap packaging and are found to have excellent deadfold performance.

Examples 34–39

The polymer prepared similarly to that described for Example 8, above, except at a larger scale, is dried overnight in a large tray dryer at 60° C. with hot dry air recirculation to a moisture content of less than 0.04 percent. Corn starch, (Corn Products 3005 from CPC International, Inc.), and rice starch, (Sigma Chemicals catalog number S7260), are dried in a large tray vacuum oven at 90° C. and less than 1 mm Hg vacuum to a moisture content of less than 1 percent and stored in sealed containers until used. Polyethylene adipate, (Rucoflex® S-101-55, nominal molecular weight of 2000, from the Ruco Polymer Corporation), is used directly as received without pretreatment.

Blends of the polymer and starch are made by manually tumbling the materials in plastic bags. The dry starch is added to the warm polymer from the dryer, and the still warm mixture fed to the extruder. When polyethylene adipate, (Rucoflex®), is used, the Rucoflex® is melted and liquid injected into the second heater zone of the extruder through a metering pump. The final compositions listed in Table 5, below are prepared.

TABLE 5

| Example | Polymer (wt. %) | Cornstarch (wt. %) | rice starch (wt. %) | Rucoflex ® (wt. %) |
|---|---|---|---|---|
| 34 | 80 | 20 | | |
| 35 | 60 | 40 | | |
| 36 | 55 | 40 | | 5 |
| 37 | 45 | 35 | | 20 |

TABLE 5-continued

| Example | Polymer (wt. %) | Cornstarch (wt. %) | rice starch (wt. %) | Rucoflex ® (wt. %) |
|---------|----------------|---------------------|---------------------|---------------------|
| 38 | 60 | | 40 | |
| 39 | 45 | 35 | | 20 |

The blends are placed in the feed hopper, (with a nitrogen purge), of a Ktron twin screw feeder, (Model Number T-35 with 190 6300 controller), and metered to a Werner and Pfleider ZSK 30 mm twin screw extruder. This extruder has an L/D of 30/1 with a vacuum port and a mild mixing screw. The temperature of the extruder barrel is electrically heated from 135° C. at the feed end of the extruder to 165° C. at the discharge. The extruder is operated at 150 RPM, and the vacuum port is connected to house vacuum and permitted to fluctuate with process conditions. A single hole die, (⅛-inch diameter), is used for discharge. The resulting strand is quenched in a 6 foot long water trough, dewatered with an air knife and cut into pellets with a Conair cutter, (Model number 304). Specific operating conditions for the individual compositions are listed below in Table 6.

TABLE 6

| Number | Feed Rate (pph) | Screw Torque (% max.) | Die Pressure (psig) | Melt Temperature (C.) | Vacuum (Inches Hg) |
|--------|-----------------|-----------------------|---------------------|------------------------|---------------------|
| 34 | 34 | 58 | 800 | 165 | 13 |
| 35 | 32 | 60 | 800 | 175 | 13 |
| 36 | 31 | 50 | 750 | 170 | 12 |
| 37 | 32 | 35 | 600 | 165 | 12 |
| 38 | 33 | 60 | 800 | 175 | 13 |
| 39 | 32 | 35 | 600 | 165 | 13 |

Examples 40–45

The polymer-starch blends prepared above in Examples 34 to 39 are dried in a hopper dryer for 8 hours at 60° C. to a −40° C. dew point. The materials are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile of

| Zone 1 (C) | Zone 2 (C) | Zone 3 (C) | Zone 4 (C) | Zone 5 (C) | Die (C) | Melt (C) |
|------------|------------|------------|------------|------------|---------|----------|
| 135 | 155 | 165 | 165 | 165 | 170 | 170 |

The extruded polymer films are electrostatically pinned on an 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils.

TABLE 7

| Example | Starch Blend Example |
|---------|----------------------|
| 40 | 34 |
| 41 | 35 |
| 42 | 36 |
| 43 | 37 |
| 44 | 38 |
| 45 | 39 |

The films are tested as fast food sandwich packaging and found to have excellent deadfold performance.

Examples 46–52

The polymer prepared similarly to that described for Example 3, above, except at a larger scale, is dried overnight in a large tray dryer at 80° C. with hot dry air recirculation to a moisture content of less than 0.04 percent. Talc, (from Luzenac, located in Englewood, Colorado, having a particle size of 3.8 microns), titanium dioxide, (supplied by Kerr-McGee Chemical, LLC, located in Oklahoma City, Okla., grade Tronox® 470, having a particle size of 0.17 micron), and calcium carbonate, (from ECCA Calcium Products, Inc., of Sylacauga, AL, ECC Supercoat (T) grade with a 1 micron average particle size), are dried in a large tray vacuum oven at 90° C. and less than 1 mm Hg vacuum to a moisture content of less than 1 percent and stored in sealed containers until used.

Blends of the polymer and the inorganic fillers are made by manually tumbling the materials in plastic bags. The dry inorganic fillers are added to the warm polymer from the dryer, and the still warm mixture fed to the extruder. The final compositions listed in Table 8, below, are prepared.

TABLE 8

| Example | Polymer (wt. %) | Talc (wt. %) | Titanium dioxide (wt. %) | Calcium carbonate (wt. %) |
|---------|-----------------|--------------|--------------------------|---------------------------|
| 46 | 85 | 2.5 | 5 | 7.5 |
| 47 | 70 | 5 | 5 | 20 |
| 48 | 70 | 5 | 10 | 15 |
| 49 | 30 | 10 | 15 | 45 |
| 50 | 95 | 5 | | |
| 51 | 95 | | 5 | |
| 52 | 70 | | | 30 |

The blends are placed in the feed hopper, (with a nitrogen purge), of a Ktron twin screw feeder, (Model Number T-35 with 190 6300 controller), and metered to a Werner and Pfleider ZSK 30 mm twin screw extruder. This extruder has an L/D of 30/1 with a vacuum port and a hard mixing screw. The temperature of the extruder barrel is electrically heated from 220° C. at the feed end of the extruder to 250° C. at the discharge. The extruder is operated at 150 RPM, and the vacuum port is connected to house vacuum and permitted to fluctuate with process conditions. A single hole die, (⅛-inch diameter), is used for discharge. The resulting strand is quenched in a 6 foot long water trough, dewatered with an air knife and cut into pellets with a Conair cutter, (Model number 304). Specific operating conditions for the individual compositions are listed below in Table 9.

TABLE 9

| Example Number | Feed Rate (pph) | Screw Torque (% max.) | Die Pressure (psig) | Melt Temperature (C.) | Vacuum (Inches Hg) |
|---|---|---|---|---|---|
| 46 | 34 | 58 | 800 | 255 | 13 |
| 47 | 30 | 70 | 800 | 260 | 13 |
| 48 | 31 | 70 | 800 | 260 | 12 |
| 49 | 32 | 80 | 800 | 270 | 12 |
| 50 | 33 | 50 | 600 | 250 | 13 |
| 51 | 32 | 50 | 600 | 250 | 13 |
| 52 | 30 | 70 | 800 | 250 | 12 |

Examples 53–59

The polymer-inorganic filler blends prepared above in Examples 46–52 and a polymer prepared similarly to that described for Example 3, above, except at a larger scale, are dried in a hopper dryer for 8 hours at 80° C. to a −40° C. dew point. The materials are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. Example 56 is composed of a tumbled blend of 50 weight percent of Example 49 and 50 weight percent of Example 3. A dry nitrogen purge is maintained in the feed hopper and the feed throat of the extruder. The extruder is operated at a 150 RPM screw speed with a heater profile of

| Zone 1 (C) | Zone 2 (C) | Zone 3 (C) | Zone 4 (C) | Zone 5 (C) | Die (C) | Melt (C) |
|---|---|---|---|---|---|---|
| 220 | 240 | 250 | 250 | 250 | 255 | 260 |

The extruded polymer films are electrostatically pinned on an 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils.

TABLE 10

| Example | Blend Example |
|---|---|
| 53 | 46 |
| 54 | 47 |
| 55 | 48 |
| 56 | 50 wt. % 49 and 50 wt. % 3 |
| 57 | 50 |
| 58 | 51 |
| 59 | 52 |

The films are tested as fast food sandwich packaging and found to have excellent deadfold performance. The films further are found to resemble paper, both in feel and appearance.

Examples 60–65

The polymers prepared similarly as described for the Examples noted below in Table 11, except at a larger scale, are dried overnight at 60° C. in a dehumidified air dryer. The dried polymers are fed to a laboratory scale blown film line that included a Killion 1.25 inch diameter extruder with a 15:1 gear reducer. The extruder heater zones are set around the temperature noted below in Table 11. The screw is a Maddock mixing type with an L/D of 24 to 1. The compression ratio for the mixing screw is 3.5:1. The screw speed is 25 to 30 RPM. A 1.21 inch diameter die with a 25 mil die gap is used. The air ring is a Killion single-lip, No. 2 type. Blowing conditions can be characterized by the blow up ratio, (BUR), which is the ratio of the bubble diameter to die the die diameter and provides an indication of hoop or transverse direction, (TD), stretch, or the draw-down ratio, (DDR), which is an indication of the axial or machined direction, (MD), stretch. The greater the level of stretch, the greater the level of orientation imbued in the film.

TABLE 11

| Example Number | Polymer Example Number | Extruder Heater Zones (C) | Film Thickness (mils) | BUR | DDR |
|---|---|---|---|---|---|
| 60 | 1 | 200 | 2.5 | 3.2 | 3.9 |
| 61 | 4 | 260 | 2.0 | 2.6 | 4.6 |
| 62 | 8 | 160 | 1.2 | 3.1 | 8.0 |
| 63 | 34 | 170 | 2.0 | 2.5 | 5.0 |
| 64 | 37 | 165 | 1.5 | 3.0 | 7.0 |
| 65 | 46 | 250 | 2.3 | 2.0 | 2.0 |

The tubular films are slit and tested as fast food sandwich packaging and found to have excellent deadfold performance.

Examples 66–68

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains a polymer prepared similarly to that described for Example 2, except at a larger scale. Layer B contains a polymer prepared similarly to that described for Example 8, except at a larger scale. Both polymers are dried in a dehumidified dryer at 60° C. The operation was tailored to provide the layer ratios for the films noted below in Table 12 as of the total film structure. The thickness of the film is about 2.25 mil (0.00225 inch). The processing conditions for the film are provided in Table 13, below.

TABLE 12

| Example | Layer A (wt. %) | Layer B (wt. %) |
|---|---|---|
| 66 | 25 | 75 |
| 67 | 50 | 50 |
| 68 | 75 | 25 |

TABLE 13

| | Extruder A | Extruder B |
|---|---|---|
| Zone 1 | 175° C. | 130° C. |
| Zone 2 | 195° C. | 150° C. |
| Zone 3 | 205° C. | 160° C. |
| Zone 4 | 205° C. | 160° C. |
| Zone 5 | 200° C. | 165° C. |
| Screen Changer | 205° C. | 160° C. |
| Adapter 1 | 205° C. | 160° C. |

TABLE 13-continued

|  | Extruder A | Extruder B |
|---|---|---|
| Adapter 2 | 205° C. | 160° C. |
| Adapter 4 | 205° C. | 160° C. |
| Die 1 | 205° C. | 205° C. |
| Die 2 | 205° C. | 205° C. |
| Die 3 | 205° C. | 205° C. |
| Line Speed | 122 feet per minute | |
| Notes | 2 | 8 |

The multilayer films prepared above are converted into bags using an inline bag machine manufactured by Battenfeld Gloucester Engineering Co., Inc. downstream of the extrusion line nips.

The slit films are tested as fast food sandwich wraps and are found to have excellent deadfold performance.

Examples 69–71

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains a polymer prepared similarly to that described for Example 36, except at a larger scale, Layer B contains a polymer prepared similarly to that described for Example 8, except at a larger scale. Both polymers are dried in a dehumidified dryer at 60° C. The operation was tailored to provide the layer ratios for the films noted below in Table 14 as of the total film structure. The thickness of the film is about 2.25 mil (0.00225 inch). The processing conditions for the film are provided in Table 15, below.

TABLE 14

| Example | Layer A (wt. %) | Layer B (wt. %) |
|---|---|---|
| 69 | 25 | 75 |
| 70 | 50 | 50 |
| 71 | 75 | 25 |

TABLE 15

|  | Extruder A | Extruder B |
|---|---|---|
| Zone 1 | 135° C. | 130° C. |
| Zone 2 | 160° C. | 150° C. |
| Zone 3 | 170° C. | 160° C. |
| Zone 4 | 170° C. | 160° C. |
| Zone 5 | 175° C. | 165° C. |
| Screen Changer | 170° C. | 160° C. |
| Adapter 1 | 170° C. | 160° C. |
| Adapter 2 | 170° C. | 160° C. |
| Adapter 4 | 170° C. | 160° C. |
| Die 1 | 170° C. | 170° C. |
| Die 2 | 170° C. | 170° C. |
| Die 3 | 170° C. | 170° C. |
| Line Speed | 122 feet per minute | |
| Notes | 36 | 8 |

The multilayer films prepared above are converted into bags using an inline bag machine manufactured by Battenfeld Gloucester Engineering Co., Inc. downstream of the extrusion line nips.

The slit films are tested as fast food sandwich wraps and are found to have excellent deadfold performance.

Examples 72–74

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains a starch-filled polymer prepared similarly to that described for Example 38. Layer B contains Eastar® Bio, from the Eastman Chemical Company and as described above. Both polymers are dried in a dehumidified dryer at 60° C. The operation was tailored to provide the layer ratios for the films noted below in Table 16 as of the total film structure. The thickness of the film is about 2.25 mil (0.00225 inch). The processing conditions for the film are provided in Table 17, below.

TABLE 16

| Example | Layer A (wt. %) | Layer B (wt. %) |
|---|---|---|
| 72 | 25 | 75 |
| 73 | 50 | 50 |
| 74 | 75 | 25 |

TABLE 17

|  | Extruder A | Extruder B |
|---|---|---|
| Zone 1 | 135° C. | 100° C. |
| Zone 2 | 160° C. | 115° C. |
| Zone 3 | 170° C. | 130° C. |
| Zone 4 | 170° C. | 130° C. |
| Zone 5 | 175° C. | 135° C. |
| Screen Changer | 170° C. | 130° C. |
| Adapter 1 | 170° C. | 130° C. |
| Adapter 2 | 170° C. | 130° C. |
| Adapter 4 | 170° C. | 130° C. |
| Die 1 | 170° C. | 170° C. |
| Die 2 | 170° C. | 170° C. |
| Die 3 | 170° C. | 170° C. |
| Line Speed | 122 feet per minute | |
| Notes | 38 | Eastar ® Bio |

The multilayer films prepared above are converted into bags using an inline bag machine manufactured by Battenfeld Gloucester Engineering Co., Inc. downstream of the extrusion line nips.

The slit films are tested as fast food sandwich wraps and are found to have excellent deadfold performance Examples 75–97 and Comparative Examples CE 11–CE 13

The polyester resins prepared similarly to that described in the Examples and Comparative Examples listed below in Table 18, except at a larger scale, are dried in a desiccant air dryer with a dew point of −40° C. overnight at a temperature of 60° C. The polyester resins are extrusion coated onto paperboard stock by feeding the dried pellets into a 2.5 inch commercial extruder having a barrel length to diameter ratio of 28:1. The five zones of the extruder are maintained at a temperature in the range noted below within Table 18. A single flight screw having eight compression flights, four metering flights, a two flight mixing section and six metering flights is used in the extruder. The screw speed is maintained at 180 revolutions per minute, (RPM). The molten polyester resins are passed through three 24×24 mesh screens. The polymers are passed through a center fed die with 0.75 inch lands having a die opening of 36 inches by 0.02 inches. The extrusion feed rate is held constant at 460 pounds per hour. The resulting extrudates are passed through a 5 inch air gap into the nip formed by a rubber-covered pressure roll and a chill roll. At the same time the paperboard stock noted below in Table 18, that is 32 inches wide, is fed into the nip with the roll in contact with the film. A nip pressure of 100 pounds per linear inch is applied. A 24-inch diameter mirror finished chill roll is maintained at a temperature of 19° C. during the extrusion trials. The coated paperboard is taken off the chill roll at a point 180° from the nip formed by the pressure roll and the chill roll. The chill roll is operated at linear speeds of 300 feet per minute. At this coating speed, a polyester resin thickness of 1.25 mils is obtained. The polyester resin thickness may be varied by operational modifications.

TABLE 18

| Example | Polymer Example | Extruder Temperature (° C.) | Paper/Paperboard Stock |
|---|---|---|---|
| CE 11 | CE 1 | 170 | 15 pound basis weight kraft paper |
| CE 12 | CE 2 | 170 | 15 pound basis weight kraft paper |
| CE 13 | CE 3 | 185 | 15 pound basis weight kraft paper |
| 75 | 1 | 210 | 15 pound basis weight kraft paper |
| 76 | 2 | 215 | 15 pound basis weight kraft paper |
| 77 | 3 | 260 | 18 pound basis weight natural paper |
| 78 | 4 | 270 | 18 pound basis weight bleached paper |
| 79 | 7 | 225 | 25 pound basis weight bleached kraft paper |
| 80 | 8 | 170 | 35 pound basis weight natural kraft paper |
| 81 | 34 | 150 | Parchment |
| 82 | 36 | 175 | 15 pound basis weight kraft paper |
| 83 | 46 | 270 | 18 pound basis weight bleached paper |
| 84 | 1 | 210 | Trilayered cup paperboard (210 g/m² weight) |
| 85 | 3 | 260 | Trilayered cup paperboard (210 g/m² weight) |
| 86 | 8 | 170 | Trilayered cup paperboard (210 g/m² weight) |
| 87 | 35 | 180 | Trilayered cup paperboard (210 g/m² weight) |
| 88 | 37 | 175 | Trilayered cup paperboard (210 g/m² weight) |
| 89 | 47 | 275 | Trilayered cup paperboard (210 g/m² weight) |
| 90 | 50 | 270 | Trilayered cup paperboard (210 g/m² weight) |
| 91 | 2 | 215 | 18 point paperboard |
| 92 | 7 | 225 | 12 point paperboard |
| 93 | 8 | 170 | 18 point paperboard |
| 94 | 38 | 180 | 12 point paperboard |
| 95 | 39 | 175 | 18 point paperboard |
| 96 | 48 | 275 | 12 point paperboard |
| 97 | 51 | 270 | 18 point paperboard |

Examples 75–83 are tested as fast food sandwich wrap packaging and are found to have excellent deadfold performance.

Comparative Examples CE 11, CE 12, and CE 13 are hampered in the production process and as fast food sandwich wrap packaging by blocking and sticking.

Examples 75–83 are formed and heat sealed by conventional processes into the shape of envelopes, bags, including for, for example, waste, trash, leaf, air-sickness, and groceries, and the like.

Examples 84–90 are formed by conventional processes into the shape of cups, glasses, bowls, trays, liquid containers and cartons, including for, for example, milk, juice, water, wine, yogurt, cream, and soda, and the like.

Examples 91–97 are formed by conventional processes into the shape of trays, boxes, lidded sandwich containers, lidded salad containers, hinged lid sandwich containers, hinged lid salad containers, and the like.

Example 98

Extrusion-coated paper laminates are prepared as described below. A resin produced similarly as described above in Example 8, above, except at a larger scale, is dried at 60° C. overnight. The resin is then placed in a hopper above the inlet of a 1 inch, (2.5 cm), extruder, (Echlin Manufacturing Company Serial Number 0717), with an 18 inch wide film die with a 0.007 inch gap. An 18 inch wide nonwoven fabric is led continuously at a speed of 47–106 feet/minute through an extrusion coating machine made by Bertek Inc., of St. Albans, Vt. The paper to be coated, (11 inch wide, 18 pound paperstock), is fed over this support fabric, and the assembly is led through a corona treatment, (made by Intercon), through an S-warp between tow 4 inch diameter rolls, heated to 150–260° F., onto a polytetrafluoroethylene-coated, matte-finished chill roll with a diameter of 12 inches, (30 cm.), at 100–200° F., around 300° of the circumference of this 12 inch diameter roll, while the resin is extruded through the die at a delivery rate found appropriate to yield a coating of the desired thickness, at a position between the chill and nip rolls as close as possible to the chill roll, (about 0.25–0.50 inches). The polymer temperature in the extruder is 340° F. and the polymer temperature in the die is 345° F. The polymer temperature may be adjusted to minimize flow irregularity. A film with 0.5 mil thickness is applied to the paper.

The paper laminate is tested as a fast food sandwich wrap packaging and found to have excellent deadfold performance.

Pieces of the above laminates, (8-inch by 8-inch squares), are placed in a rotary composter with about 0.5 cubic yards squared of mixed municipal solid waste, (from which glass, cans, and much of the light plastic and paper is removed), and sewage sludge in the ratio of about 2:1. The composter is rotated once a week and the temperature and moisture content is monitored. The laminates are found to rapidly disintegrate.

Example 99

A polymer prepared similarly to as described in Example 8, except at a larger scale, and poly(lactide), (from the Cargill Dow Company), are dried in a hopper dryer overnight at 60° C. to a −40° C. dew point. On a trilayered paperboard that weighed 210 grams/meter2 with a forward speed of 150 meters/minute is coextruded the Example 8 polymer and poly(lactide) in a weight ratio of 1:3. The melt temperature of the Example 8 polymer is 170° C. and the melt temperature of the poly(lactide) is 240° C. A coated paperboard is obtained where the total weight of the polymeric coating is 19.4 grams/meter.sup.2 in a weight ratio of 75 weight percent of the poly(lactide), which formed the outer layer, and 25 weight percent of the polymer from Example 8, which formed the inner layer adhered to the paperboard.

The paperboard prepared above is formed by conventional processes into the shape of cups, glasses, bowls, trays, liquid containers and cartons, including for, for example, milk, juice, water, wine, yogurt, cream, and soda, and the like.

Examples 100–105

Calendered paper laminates are prepared by making an assembly of the film produced as described above in Examples noted below in Table 19, coated onto release paper, in contact with a similar sized sheet of paper to be coated, and then pressing this assembly through the nip between a heated polished metal top roll and an unheated resilient (silk) roll at a surface speed of 5 yards/minute, at a temperature of 200° F. and under a pressure of 10 tons.

Details of the various paper substrates of the laminated paper products are given in Table 19, below.

TABLE 19

| Example | Film Example | Paper Substrate | Paper Basis Wt./Thickness (oz/yd. sup. 2/mils) |
|---|---|---|---|
| 100 | 11 | Towel, (Scott, Viva) | 1.2/6 |
| 101 | 16 | Towel, (G. P., Sparkle) | 1.3/10 |
| 102 | 22 | Toilet Tissue, (Charmin) | 0.9/6 |
| 103 | 31 | Wrapping Tissue, (white) | 0.5/2 |
| 104 | 42 | Newsprint | 1.5/4 |
| 105 | 54 | Kraft, (recycled) | 2.8/6 |

Pieces of the above laminates, (8-inch by 8-inch squares), are placed in a rotary composter with about 0.5 cubic yards squared of mixed municipal solid waste, (from which glass, cans, and much of the light plastic and paper is removed), and sewage sludge in the ratio of about 2:1. The composter is rotated once a week and the temperature and moisture content is monitored. The laminates are found to rapidly disintegrate.

Example 106

A laminated stock is produced from a combination of a paperboard and a corona-treated polyester film using a combination of two water-based acrylic adhesive formulations. The paperboard base stock is a bleached white paperboard of the type typically referred to as a solid bleached sulfate (SBS) paperboard, which is well known as a base stock for food packaging materials. The particular paperboard used here is uncoated milk carton stock with a thickness of 0.0235 inch and weighing 282 pounds per 3,000 square feet The film is produced as described in Example 55, above, and is corona discharge treated by conventional means on one side to enhance adhesive bonding. The lamination process is run on a conventional wet-bond laminating machine with adhesive stations for applying adhesive to both the paperboard and to the film. Adhesive is applied to the paperboard with a 110 line gravure roll applicator delivering about 3 pounds of wet adhesive per 1,000 square feet of paperboard. The adhesive applied to the paperboard consists of 200 pounds of Rhoplex® N-1031 acrylic latex from the Rohm & Haas Company and 1.5 ounces of Foamaster NXZ defoamer (predispersed in an equal volume of water) from the Diamond Shamrock Chemical Company. Adhesive is applied to the corona-treated side of the polyester film. The adhesive applied consists of 375 pounds of Rhoplex® N-1031 acrylic latex from the Rohm & Haas Company, 11.5 pounds of Cymel® 325 melamine-formaldehyde crosslinking agent, 11.5 pounds of isopropyl alcohol, 23 pounds of water, and 3 ounces of Foamaster NXZ defoamer (predispersed in an equal volume of water) from the Diamond Shamrock Chemicals Company.

The laminating process is run with the paperboard and the film running simultaneously through the respective adhesive application stations, and then the paperboard and the film are both directed into a laminating nip where the two adhesive-coated surfaces are joined with the adhesive still moist on both surfaces. The laminating machine is run at a rate of 300 to 350 feet per minute. The laminated stock is run the laminating nip into a hot air oven with an air temperature of 400° F. Residence time for the laminated stock in the oven is about 5 seconds. The laminated stock is then run over a chill roll and rewound into a finished roll.

The laminated stock prepared above is formed by conventional processes into the shape of cups, glasses, bowls, trays, liquid containers and cartons, including for, for example, milk, juice, water, wine, yogurt, cream, and soda, and the like.

Examples 107–135

These examples demonstrate the lamination of the films onto preformed substrates. The operation is conducted in a Lab Form Inc. forming machine with a 10 by 10-inch platen. The preformed substrate is shuttled onto the platen. The film is unrolled, preheated for the time noted below in Table 20 by "Black Box Heating" with infrared type heaters. The preheated film is then positioned over the preformed substrate and pulled down onto the preformed substrate. Examples 107–116 utilize vacuum lamination by drawing a vacuum through the preformed substrate, which, in turn, draws the film onto the contours of the preformed substrate. Examples 117–125 utilize plug assisted vacuum lamination whereby, in addition to the above described vacuum, a plug helps to push the preheated film from the side opposite the preformed substrate to help reduce film thinning into deep draw preformed substrates. Examples 126–135 utilize pressure lamination by applying an air pressure to the preheated film side opposite to the preformed substrate, which forces the film onto the contours of the preformed substrate. The lamination process typically takes from 5 to 100 seconds, at which time excess film is trimmed off the laminated substrate and the laminated substrate is ejected and cooled.

The preformed substrates used within these examples are as follows. A 9-inch molded "pulp plate", prepared by conventional processes. A formed frozen dinner paperboard "tray", prepared by conventional processes. A formed paperboard coffee "cup", 3.5 inches tall, prepared by conventional processes. A formed paperboard "bowl", 3 inches tall and 4 inches in diameter, prepared by conventional processes. A 9 inch "foam plate", obtained by carefully stripping off the barrier film from commercially available plates obtained from the EarthShell Company, (Stock Number PL9V00001). A 12 ounce "foam bowl", obtained by carefully stripping off the barrier film from commercially available bowls obtained from the EarthShell Company, (Stock Number BL12V0001). Hinged-lid salad and sandwich "foam containers" with a double-tab closure mechanism, obtained by carefully stripping off the barrier film from commercially available containers obtained from the EarthShell Company, (Stock Number CLS00001).

TABLE 20

| Example | Film Example | Film Preheat Time (seconds) | Preformed Substrate |
|---|---|---|---|
| 107 | 11 | 40 | pulp plate |
| 108 | 13 | 50 | tray |
| 109 | 16 | 20 | cup |
| 110 | 17 | 50 | bowl |
| 111 | 30 | 40 | foam plate |
| 112 | 41 | 30 | foam bowl |
| 113 | 53 | 60 | foam containers |
| 114 | 66 | 20 | pulp plate |
| 115 | 69 | 20 | tray |
| 116 | 72 | 30 | foam plate |
| 117 | 12 | 40 | cup |
| 118 | 14 | 60 | bowl |
| 119 | 16 | 20 | foam bowl |
| 120 | 21 | 55 | foam containers |
| 121 | 43 | 20 | cup |
| 122 | 54 | 60 | bowl |
| 123 | 67 | 20 | foam bowl |

TABLE 20-continued

| Example | Film Example | Film Preheat Time (seconds) | Preformed Substrate |
|---|---|---|---|
| 124 | 70 | 20 | foam containers |
| 125 | 73 | 30 | cup |
| 126 | 11 | 40 | tray |
| 127 | 15 | 45 | cup |
| 128 | 16 | 20 | bowl |
| 129 | 22 | 30 | foam plate |
| 130 | 32 | 30 | foam bowl |
| 131 | 44 | 30 | foam containers |
| 132 | 55 | 60 | pulp plate |
| 133 | 68 | 20 | tray |
| 134 | 71 | 20 | foam plate |
| 135 | 74 | 30 | pulp plate |

What is claimed is:

1. A sulfonated aliphatic-aromatic copolyester comprising an acid component, a glycol component, and 0 to about 5.0 mole percent based on 100 mole % acid component of a polyfunctional branching agent selected from polyfunctional acid, glycol or mixtures thereof, wherein the acid component comprises
   a. about 97.95 to about 20.0 mole percent of an aromatic dicarboxylic acid component based on 100 mole percent total acid component, and
   b. about 2.0 to about 79.95 mole percent of an aliphatic dicarboxylic acid component based on 100 mole percent total acid component, and
   c. about 0.05 to about 0.75 mole percent of a sulfonate component based on 100 mole percent total acid component, and wherein the glycol component comprises
      a. about 100 to about 95.0 mole percent of ethylene glycol as a first glycol component based on 100 mole percent total glycol component, and
      b. 0 to about 5.0 mole percent of one or more of a second glycol component based on 100 mole percent total glycol component.

2. The sulfonated aliphatic-aromatic copolyester of claim 1 further comprising one or more fillers.

3. The sulfonated aliphatic-aromatic copolyester of claim 2 comprising up to about 75 weight percent of said filler based on the total combined weight of the sulfonated aliphatic-aromatic copolyester and the filler.

4. A biodegradable sulfonated aliphatic-aromatic copolyester of claim 1.

5. A shaped article formed from the sulfonated aliphatic-aromatic copolyester of claim 1.

6. A shaped article of claim 5 selected from the group consisting of film, oriented film, laminate and coating.

7. A film formed from the sulfonated aliphatic-aromatic copolyester of claim 1.

8. An oriented film of claim 7.

9. A biaxially oriented film of claim 7.

10. A film of claim 7, said film further comprising a filler.

11. The film of claim 10 comprising from about 3 weight percent to about 40 weight percent of said filler based on the total combined weight of the copolyester and the filler.

12. The film of claim 10 wherein said filler comprises a space filling mixture of a first set of particles and a second set of particles, said first set of particles having average particle diameters of about 5 microns or more, and said second set of particles having average particle diameters of about 0.7 microns or less.

13. The film of claim 10 wherein the filler is selected from the group consisting of inorganic fillers, organic fillers and clay fillers.

14. The film of claim 13, wherein said inorganic filler is selected from the group consisting of calcium carbonate, titanium dioxide, silica, talc, barium sulfate, glass beads, glass fiber, carbon black, ceramics, chalk and mixtures thereof.

15. The film of claim 13, wherein said organic filler is selected from the group consisting of natural starch, modified starch, chemically modified starch, rice starch, corn starch, wood flour, cellulose, and mixtures thereof.

16. The film of claim 13, wherein said clay filler is selected from the group consisting of natural clays, synthetic clays, treated clays, untreated clays, organoclays, smectite clays, bentonite clays, hectorite days, wollastonite clays, montmorillonite clays, kaolin, and mixtures thereof.

17. A film comprising a blend comprising about 95.0 to about 5.0 weight percent of a sulfonated aliphatic-aromatic copolyester of claim 1 and about 5,0 to about 95.0 weight percent of a polymeric material.

18. The film of claim 17 wherein the polymeric material is selected from the group consisting of biodegradable materials, nonbiodegradable materials, naturally derived materials, modified naturally derived materials, synthetic materials, and mixtures thereof.

19. The film of claim 18, wherein the polymeric material is a biodegradable material.

20. The film of claim 19, wherein the biodegradable material is selected from the group consisting of poly (alkanoate)s, aliphatic polyesters, aliphatic-aromatic polyesters, aliphatic-aromatic polyetheresters, aliphatic-aromatic polyamideesters, sulfonated aliphatic-aromatic polyesters, sulfonated aliphatic-aromatic polyetheresters, thermoplastic starch, and mixtures thereof.

21. The film of claim 18, wherein the polymeric material is a nonbiodegradable material.

22. The film of claim 17, further comprising a filler.

23. The film of claim 22, wherein the filler comprises a space filling mixture of a first set of particles and a second set of particles, said first set of particles having average particle diameters of about 6 microns or more, and said second set of particles having average particle diameters of about 0.7 microns or less.

24. The film of claim 22 wherein the filler is selected from the group consisting of inorganic fillers, organic fillers and clay fillers.

25. The film of claim 24, wherein the inorganic filler is selected from the group consisting of calcium carbonate, titanium dioxide, silica, talc, barium sulfate, glass beads, glass fiber, carbon black, ceramics, chalk and mixtures thereof.

26. The film of claim 24, wherein the organic filler is selected from the group consisting of natural starch, modified starch, chemically modified starch, rice starch, corn starch, wood flour, cellulose, and mixtures thereof.

27. The film of claim 24, wherein the clay filler is selected from the group consisting of natural clays, synthetic clays, treated clays, untreated clays, organoclays, smectite clays, bentonite clays, hectorite clays, wollastonite clays, montmorillonite clays, kaolin, and mixtures thereof.

28. An article comprising a substrate and a sulfonated aliphatic-aromatic copolyester of claim 1 laminated thereon.

29. The article of claim 28 wherein the substrate is selected from the group consisting of paper, paperboard, inorganic foams, organic foams, and inorganic-organic foams.

30. The article of claim 28, wherein said sulfonated aliphatic-aromatic copolyester further comprises a filler.

31. The article of claim 30, wherein the filler comprises a space filling mixture of a first set of particles and a second set of particles, said first set of particles having average particle diameters of about 5 microns or more, and said second set of particles having average particle diameters of about 0.7 microns or less.

32. An article comprising a substrate having a coating comprising a sulfonated aliphatic-aromatic copolyester of claim 1 thereon.

33. The article of claim 32 wherein said coating is applied by a method selected from the group consisting of solution, dispersion, latex, or emulsion casting, powder coating, and extrusion.

34. The article of claim 32 wherein said substrate comprises a material selected from the group consisting of paper, paperboard, metal, paperboard, inorganic foams, organic foams, and inorganic-organic foams.

35. The article of claim 28, wherein said sulfonated aliphatic-aromatic copolyester further comprises a filler.

36. The article of claim 35, wherein the filler comprises a space filling mixture of a first set of particles and a second set of particles, said first set of particles having average particle diameters of about 5 microns or more, and said second set of particles having average particle diameters of about 0.7 microns or less.

37. A blend comprising a sulfonated aliphatic-aromatic copolyester comprising from about 97.95 to about 20.0 mole percent of an aromatic dicarboxylic acid component, from about 2.0 to about 79.95 mole percent of an aliphatic dicarboxylic acid component, from about 0.05 to about 0.75 mole percent of a sulfonate component, from about 100.0 to about 95.0 mole percent of ethylene glycol, from 0 to about 5.0 mole percent of a second glycol component, and from 0 to about 5.0 mole percent of a polyfunctional branching agent, and one or more other polymeric materials.

38. The blend of claim 37 wherein said polymeric material is biodegradable.

39. The blend of claim 38 wherein said biodegradable polymeric material is selected from the group consisting of starch, chemically modified starch, thermoplastic starch, aliphatic polyesters, poly(alkanoates), aliphatic-aromatic copolyesters, and sulfonated aliphatic-aromatic copolyesters.

40. The blend of claim 37 wherein said polymeric material is non-biodegradable.

41. The blend of claim 40 wherein said non-biodegradable polymeric material is selected from the group consisting of polyesters, ethylene copolymers, polyolefins, and polyamides.

42. The sulfonated aliphatic-aromatic copolyester of claim 1 comprising from about 80 to about 50 mole percent of said aromatic dicarboxylic acid component.

43. The sulfonated aliphatic-aromatic copolyester of claim 1 wherein said aromatic dicarboxylic acid component is selected from the group consisting of terephthalic acid, dimethyl terephthalate, isophthalic acid, dimethyl isophthalate, 2,6naphthalene dicarboxylic acid, dimethyl-2,6-naphthalate, and mixtures thereof.

44. The sulfonated aliphatic-aromatic copolyester of claim 1 comprising from about 20 to about 50 mole percent of the aliphatic dicarboxylic acid component.

45. The sulfonated aliphatic-aromatic copolyester of claim 1 wherein said aliphatic dicarboxylic acid component is selected from the group consisting of succinic acid, dimethyl succinate, glutaric acid, dimethyl glutarate, adipic acid, dimethyl adipate and mixtures thereof.

46. The sulfonated aliphatic-aromatic copolyester of claim 1 comprising from about 0.1 to 0.75 mole percent of said sulfonate groups.

47. The sulfonated aliphatic-aromatic copolyester of claim 1 wherein said sulfonate group comprises a sodium salt of dimethyl-5-sulfolsophthalate.

48. The sulfonated aliphatic-aromatic copolyester of claim 1 having an inherent viscosity of at least about 0.15 dL/g.

49. The sulfonated aliphatic-aromatic copolyester of claim 1 having an inherent viscosity of at least about 0.35 dL/g.

50. The sulfonated aliphatic-aromatic copolyester of claim 1 having an inherent viscosity of at least about 0.65 dL/g.

51. The sulfonated aliphatic-aromatic copolyester of claim 1 comprising about 1 mole percent or less of said branching agent.

52. The sulfonated aliphatic aromatic polyester of claim 1 wherein said branching agent is selected from the group consisting of 1,2,4-benzenetricarboxylic acid (trimellitic acid), trimethyl-1,2,4-benzenetricarboxylate, tris(2-hydroxyethyl)-1,2,4-benzenetricarboxylate, 1,2,4-benzenetricarboxylic anhydride (trimellitic anhydride), 1,3,5-benzenetricarboxylic acid, 1,2,4,5-benzenetetracarboxylic acid (pyromellitic acid), 1,2,4,5-benzenetetracarboxylic dianhydride (pyromellitic anhydride), pentaerythritol, glycerol, and mixtures thereof.

53. The sulfonated aliphatic aromatic polyester of claim 10 wherein said filler comprises a first set of particles and a second set of particles, said second set of particles having an average diameter at least about twice the average diameter of said first set of particles.

54. The sulfonated aliphatic aromatic polyester of claim 10 wherein said filler consists essentially of particles having average diameters less than about 20 microns.

55. A food package comprising a sulfonated aliphatic aromatic copolyester of claim 1.

56. A sheet comprising a sulfonated aliphatic aromatic copolyester of claim 1.

57. A sheet of claim 56 having a thickness from about 0.25 mm to about 25 mm.

58. A fiber comprising a sulfonated aliphatic aromatic copolyester of claim 1.

59. A fiber of claim 58 having a denier from about 0.1 to about 100.

60. A fiber of claim 58 having a denier from about 0.5 to about 20.

61. A fiber of claim 58 having a denier from about 0.7 to about 10.

62. A heterogeneous fiber composition comprising a fiber comprising a sulfonated aliphatic aromatic copolyester of claim 1, and at least one other fiber.

63. A process for producing a package, comprising providing a substrate; forming said substrate into a desired package form; providing a sulfonated aliphatic-aromatic copolyester of claim 1; and laminating or coating said substrate with said sulfonated aliphatic-aromatic copolyester to form said package.

64. The process of claim 63 wherein said substrate comprises a material selected from the group consisting of paper, paperboard, inorganic foams, organic foams, and inorganic-organic foams.

65. The process of claim 63 wherein said package form is selected from the group consisting of wrappers, stretch wrap films, bags, cups, trays, cartons, boxes, bottles, crates, packaging films, blister pack wrappers, skin packaging, and hinged containers.

66. A package comprising a substrate and a film containing a sulfonated aliphatic-aromatic copolyester of claim 1.

67. The package of claim 66, wherein said package is selected from the group consisting of wrappers, stretch wrap films, bags, cups, trays, cartons, boxes, bottles, crates, packaging films, blister pack wrappers, skin packaging, and hinged containers.

68. The package of claim 66, wherein said film is laminated onto said substrate.

69. The package of claim 66, wherein said substrate is selected from the group consisting of paper, paperboard, inorganic foams, organic foams, and inorganic-organic foams.

70. The package of claim 66, wherein said package comprises a substrate coated by said film.

71. The package of claim 70, wherein said substrate is selected from the group consisting of paper, paperboard, inorganic foams, organic foams, and inorganic-organic foams.

72. The package of claim 66, wherein said film is uniaxially oriented.

73. The package of claim 66, wherein said film is biaxially oriented.

74. The package of claim 66, wherein said sulfonated aliphatic-aromatic copolyester contains a filler.

75. The package of claim 74, wherein the filler comprises a mixture of a first set of particles and a second set of particles, said first set of particles having average particle diameters of about 5 microns or more, and said second set of particles having average particle diameters of about 0.7 microns or less.

76. The package of claim 75 wherein the filler is selected from the group consisting of inorganic fillers, organic fillers and clay fillers.

77. The package of claim 76, wherein said inorganic filler is selected from the group consisting of calcium carbonate, titanium dioxide, silica, talc, barium sulfate, glass beads, glass fiber, carbon black, ceramics, chalk and mixtures thereof.

78. The package of claim 76, wherein said organic filler is selected from the group consisting of natural starch, modified starch, chemically modified starch, rice starch, corn starch, wood flour, cellulose, and mixtures thereof.

79. The package of claim 76, wherein said clay filler is selected from the group consisting of natural clays, synthetic clays, treated clays, untreated clays, organclays, smectite clays, bentonite clays, hectorite clays, wollastonite clays, montmorillonite clays, kaolin, and mixtures thereof.

* * * * *

UNITED STATES PATENT AND TRADEMARK OFFICE
CERTIFICATE OF CORRECTION

PATENT NO. : 6,787,245 B1
DATED : September 7, 2004
INVENTOR(S) : Hayes

It is certified that error appears in the above-identified patent and that said Letters Patent is hereby corrected as shown below:

Column 58,
Line 38, delete "6"; add -- 5 --, so line reads:
"particle diameters of about 5 microns or more, and said"

Column 59,
Line 2, add a space between 5 and microns, so line reads:
"particle diameters of about 5 microns or more, and said"
Line 55, add "-" between 2,6 and naphthalene, so line reads:
"isophthalate, 2,6-naphthalene dicarboxylic acid, dimethyl-2,"

Signed and Sealed this

Third Day of May, 2005

JON W. DUDAS
*Director of the United States Patent and Trademark Office*